US012211328B2

(12) United States Patent
Kirkjan

(10) Patent No.: US 12,211,328 B2
(45) **Date of Patent: *Jan. 28, 2025**

(54) CONTACTLESS ELECTRONIC ACCESS CONTROL SYSTEM

(71) Applicant: LockFOB, LLC, Palm Desert, CA (US)

(72) Inventor: Gregory Paul Kirkjan, Palm Desert, CA (US)

(73) Assignee: LockFOB, LLC, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,737

(22) Filed: Oct. 30, 2023

(65) Prior Publication Data

US 2024/0249573 A1 Jul. 25, 2024

Related U.S. Application Data

(63) Continuation of application No. 17/392,101, filed on Aug. 2, 2021, now Pat. No. 11,804,084, which is a (Continued)

(51) Int. Cl.
*G07C 9/00* (2020.01)

(52) U.S. Cl.
CPC ..... *G07C 9/00182* (2013.01); *G07C 9/00309* (2013.01); *G07C 2009/00634* (2013.01); (Continued)

(58) Field of Classification Search
CPC ...... G06Q 20/401; G06Q 20/40; G06Q 20/20; G06Q 20/382; G06Q 20/12; G06Q 20/3823; G06Q 30/06
See application file for complete search history.

(56) References Cited

U.S. PATENT DOCUMENTS 3,671,752 A 6/1972 Bostrom
3,733,862 A 5/1973 Killmeyer
(Continued)

FOREIGN PATENT DOCUMENTS

CN 112360240 2/2021
EP 0 846 823 A1 6/1998
(Continued)

OTHER PUBLICATIONS

"AL1 Range Data Sheet", Servocell Document No. 900 004, Issue B, Mar. 31, 2005, pp. 1-5.

(Continued)

*Primary Examiner* — Joseph H Feild
*Assistant Examiner* — Sharmin Akhter
(74) *Attorney, Agent, or Firm* — Knobbe, Martens, Olson & Bear, LLP

(57) ABSTRACT

An embodiment of an electronic access control system includes an electronic access apparatus, an electronic lock, and an access control administration program. The electronic access apparatus provides a wireless power signal and a wireless digital data signal to the electronic lock. The wireless power signal can be the only source of power used by the electronic lock to actuate an electronic lock mechanism. In some embodiments, the lock mechanism includes a piezoelectric latch.

24 Claims, 13 Drawing Sheets

Related U.S. Application Data continuation of application No. 16/687,329, filed on Nov. 18, 2019, now Pat. No. 11,080,951, which is a continuation of application No. 15/645,740, filed on Jul. 10, 2017, now Pat. No. 10,482,697, which is a continuation-in-part of application No. 14/584,954, filed on Dec. 29, 2014, now Pat. No. 9,704,316, which is a continuation-in-part of application No. 14/023,248, filed on Sep. 10, 2013, now Pat. No. 8,922,333.

(52) U.S. Cl.
CPC .............. *G07C 2009/00785* (2013.01); *G07C 2009/00793* (2013.01); *Y10T 70/7051* (2015.04); *Y10T 70/7062* (2015.04); *Y10T 70/7136* (2015.04)

(56) References Cited

U.S. PATENT DOCUMENTS 4,144,523 A 3/1979 Kaplit
4,157,534 A 6/1979 Schlachter
4,326,124 A 4/1982 Faude
4,558,175 A 12/1985 Genest et al.
4,562,712 A 1/1986 Wolter
4,663,952 A 5/1987 Gelhard
4,686,358 A 8/1987 Seckinger et al.
4,713,660 A 12/1987 Camenzind
4,833,465 A 5/1989 Abend et al.
5,089,692 A 2/1992 Tonnesson
5,140,317 A 8/1992 Hyatt, Jr. et al.
5,144,667 A 9/1992 Pogue et al.
5,198,643 A 3/1993 Miron et al.
5,245,329 A 9/1993 Gokcebay
5,477,041 A 12/1995 Miron et al.
5,491,470 A 2/1996 Veligdan
5,493,882 A 2/1996 Jasper
5,905,446 A 5/1999 Benore et al.
6,046,558 A 4/2000 Larson et al.
6,125,185 A 9/2000 Boesch
6,382,003 B1 5/2002 Watanuki et al.
6,900,720 B2 5/2005 Denison et al.
6,965,295 B2 11/2005 Shimonomoto et al.
6,980,672 B2 12/2005 Saito et al.
7,009,489 B2 3/2006 Fisher
7,009,490 B2 3/2006 Wong et al.
7,549,161 B2 6/2009 Poo et al.
7,821,395 B2 10/2010 Denison et al.
8,035,477 B2 10/2011 Kirkjan
8,209,462 B2 6/2012 Cheng et al.
8,228,030 B2 7/2012 Pukari et al.
8,339,239 B2 12/2012 Kirkjan
8,347,674 B2 1/2013 Trempala et al.
8,354,814 B2 1/2013 Buckingham et al.
8,468,861 B2 6/2013 Pukari et al.
8,516,250 B2 8/2013 Lohiniva et al.
8,581,690 B2 11/2013 Lappalainen et al.
8,761,390 B2 6/2014 Peirce et al.
8,774,714 B2 7/2014 Metivier
8,866,439 B2 10/2014 Pukari et al.
8,899,081 B2 12/2014 Pukari et al.
8,904,180 B2 12/2014 Allen
8,922,333 B1 12/2014 Kirkjan
8,941,469 B1 1/2015 Diorio et al.
8,981,899 B2 3/2015 Pukari et al.
9,020,147 B2 4/2015 Kawamura et al.
9,205,336 B1 12/2015 Yano
9,406,178 B2 8/2016 Pukari
9,558,602 B1 1/2017 Straz
9,574,376 B2 2/2017 Kananen
9,626,859 B2 4/2017 Ribas et al.
9,704,316 B2 7/2017 Kirkjan
9,984,524 B2 5/2018 Fares et al.
10,134,208 B2 11/2018 Ferry
10,253,528 B1 4/2019 Pukari
10,378,239 B2 8/2019 Avganim
10,443,269 B2 10/2019 Piirainen et al.
10,450,777 B2 10/2019 Pukari
10,482,697 B2 11/2019 Kirkjan
10,563,424 B2 2/2020 Kim
10,580,239 B2 3/2020 Stephens et al.
10,601,828 B2 3/2020 Avetisov et al.
10,641,008 B2 5/2020 Pukari
10,769,873 B1 9/2020 Sun et al.
10,844,632 B2 11/2020 Pukari
10,872,484 B1 12/2020 Pukari
10,890,014 B2 1/2021 Pukari
10,920,454 B2 2/2021 Pukari
11,017,621 B1 5/2021 Pukari
11,080,951 B2 8/2021 Kirkjan
11,082,412 B2 8/2021 Leavy et al.
D934,817 S 11/2021 Svärd
11,164,407 B2 11/2021 Tikkanen et al.
11,168,493 B2 11/2021 Kellokoski
11,228,453 B2 1/2022 Klink et al.
11,263,344 B2 3/2022 Vágujhelyi et al.
11,408,205 B2 8/2022 Piirainen et al.
11,414,887 B2 8/2022 Piirainen et al.
11,566,446 B2 1/2023 Pukari
11,574,513 B2 2/2023 Kirkjan
11,619,069 B2 4/2023 Pukari
11,804,084 B2 10/2023 Kirkjan
12,027,001 B2 7/2024 Kirkjan
2002/0139156 A1 10/2002 Aramburu et al.
2002/0180582 A1 12/2002 Nielsen
2003/0122651 A1 7/2003 Doi et al.
2004/0225832 A1 11/2004 Huang
2005/0051621 A1 3/2005 Wong et al.
2005/0184106 A1 8/2005 Damrath et al.
2006/0176146 A1 8/2006 Krishan et al.
2006/0192653 A1 8/2006 Atkinson et al.
2006/0261932 A1 11/2006 Ando et al.
2007/0115761 A1 5/2007 Song
2007/0132550 A1 6/2007 Avraham et al.
2007/0296545 A1 12/2007 Clare
2008/0157928 A1 7/2008 Butler et al.
2009/0256676 A1* 10/2009 Piccirillo ........... G07C 9/00309 340/5.65
2010/0073129 A1 3/2010 Pukari
2010/0096447 A1 4/2010 Kwon et al.
2010/0201481 A1 8/2010 Au et al.
2012/0001590 A1 1/2012 Yeh
2012/0047972 A1 3/2012 Grant et al.
2012/0096909 A1* 4/2012 Hart ....................... G08C 17/02 70/278.1
2012/0270496 A1 10/2012 Kuenzi et al.
2012/0280789 A1 11/2012 Gerhardt et al.
2014/0292481 A1 10/2014 Dumas et al.
2015/0102904 A1 4/2015 Oh et al.
2015/0332533 A1 11/2015 Meganck
2015/0372813 A1 12/2015 Brand
2016/0160531 A1 6/2016 Piirainen et al.
2019/0153752 A1 5/2019 Pagnoncelli
2020/0291683 A1 9/2020 Tikkanen et al.
2022/0327877 A1 10/2022 Pukari
2022/0341218 A1 10/2022 Piirainen et al.
2023/0120520 A1 4/2023 Pukari

FOREIGN PATENT DOCUMENTS

EP 2 017 412 1/2009
EP 2 017 413 1/2009
EP 2 017 794 1/2009
EP 2 017 795 1/2009
EP 2 043 055 4/2009
EP 2 157 552 2/2010
EP 1 786 998 3/2010
EP 1 808 816 4/2010
EP 2 336 460 6/2011
EP 2 348 490 7/2011
EP 2 354 389 8/2011
EP 2 592 601 5/2013
EP 2 674 552 12/2013

(56) References Cited

FOREIGN PATENT DOCUMENTS

| | | |
|---|---|---|
| EP | 2 813 647 | 12/2014 |
| EP | 2 859 162 | 7/2016 |
| EP | 3 118 977 | 1/2017 |
| EP | 3 217 365 | 9/2017 |
| EP | 3 363 971 | 8/2018 |
| EP | 3 373 457 | 9/2018 |
| EP | 3 480 395 | 5/2019 |
| EP | 3 480 396 | 5/2019 |
| EP | 3 666 998 | 6/2020 |
| EP | 3 719 762 | 10/2020 |
| EP | 3 783 175 | 2/2021 |
| EP | 3 819 878 | 5/2021 |
| EP | 3 825 496 | 5/2021 |
| EP | 3 951 727 | 2/2022 |
| EP | 4 144 942 | 3/2023 |
| JP | 2008-014070 | 1/2008 |
| WO | WO 00/009836 | 2/2000 |
| WO | WO 01/023695 | 4/2001 |
| WO | WO 2006/008340 | 1/2006 |
| WO | WO 2007/068794 | 6/2007 |
| WO | WO 2009/010635 | 1/2009 |
| WO | WO 2009/010637 | 1/2009 |
| WO | WO 2009/010638 | 1/2009 |
| WO | WO 2009/010639 | 1/2009 |
| WO | WO 2009/040470 | 4/2009 |
| WO | WO 2013/068344 | 5/2013 |
| WO | WO 2013/186166 | 12/2013 |
| WO | WO 2014/199012 | 12/2014 |
| WO | WO 2017/009277 | 1/2017 |
| WO | WO 2017/153514 | 9/2017 |
| WO | WO 2018/149919 | 8/2018 |
| WO | WO 2018/162367 | 9/2018 |
| WO | WO 2019/086240 | 5/2019 |
| WO | WO 2019/086587 | 5/2019 |
| WO | WO 2019/162560 | 8/2019 |
| WO | WO 2019/162561 | 8/2019 |
| WO | WO 2019/162566 | 8/2019 |
| WO | WO 2021/089907 | 5/2021 |
| WO | WO 2021/099388 | 5/2021 |
| WO | WO 2024/044335 | 2/2024 |

OTHER PUBLICATIONS

"AL3 Data Sheet R112", Copyright 2012, RCI Rutherford Controls International Corp., Virginia Beach, VA.

Apple, "iOS Security", iOS 10, White Paper, Mar. 2017, pp. 68.

Diffie, Whitfield, "New Directions in Cryptoography", IEEE Transactions on Information Theory, Nov. 1976, vol. IT-22, No. 6, pp. 644-654.

Diffie, Whitfield, "The First Ten Years of Public-Key Cryptography", Proceedings of the IEEE, May 1988, vol. 76, No. 5, pp. 560-577.

Lake, Josh, "What is the Diffie-Hellman key exchange and how does it work?", https://www.comparitech.com/blog/information-security/diffie-hellman-key-exchange/, Mar. 15, 2019, pp. 16.

Patauner et al., "High Speed FRID/NFC at the Frequency of 13.56 MHz", Sep. 2007, Proceedings from the First International EURASIP Workshop on FRID Technology, Vienna, Austria, pp. 4.

* cited by examiner

CONTACTLESS ELECTRONIC ACCESS CONTROL SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field

This disclosure relates to the field of electronic access control and, more particularly, to contactless wireless electronic access control systems and methods for electronic locks.

Description of Related Art

Lock and key sets are used in a variety of applications, such as in securing file cabinets, facilities, safes, equipment, and the like. Some traditional mechanical lock and key sets can be operated without the use of electrical energy. However, mechanical access control systems and methods can be costly and cumbersome to administer. For example, an administrator of a mechanical access control system may need to physically replace several locks and keys in a system if one or more keys cannot be accounted for.

Electronic lock and key systems have also been used for several years, and some have proven to be reliable mechanisms for access control. Electronic access control systems can include an electronic key that is configured to connect to a locking mechanism via a key interface. In some electronic access control systems, the electronic key can be used to operate the locking mechanism via the key interface.

Existing electronic access control systems suffer from various drawbacks. For example, electronic lock systems can be rendered inoperable when a power source is disconnected. If the electronic access control systems use batteries or an external power source, the systems can stop operating at inopportune times, making it impossible to unlock or lock doors without dismantling the electronic access control systems.

SUMMARY

In certain embodiments, an electronic lock is capable of operating based on power received from an electronic access apparatus, such as an electronic key. In some embodiments, the electronic access apparatus includes a housing having a processor configured to communicate with a lock microcontroller associated with an electronic lock. The apparatus can also include a memory device storing a key identifier, a rechargeable battery configured to supply energy to components of the apparatus and an electromagnetic radiation source. The electromagnetic radiation source configured to transmit a wireless digital data signal to an electromagnetic radiation receiver, and transmit a wireless power signal to the electronic lock to provide power to the electronic lock sufficient to actuate a lock mechanism within the electronic lock. The electromagnetic radiation source is configured to transmit the key identifier to the lock microcontroller via the digital data signal. The electronic access apparatus is capable of actuating the electronic lock without any electrical conductor power connection to the electronic lock, and the apparatus and/or optical light incident on the electronic lock are the only sources of electric power for the electronic lock.

In some embodiments, the electromagnetic radiation source is an optical light source. The electromagnetic radiation source can be configured to transmit power via the optical light source. The electromagnetic radiation source can be configured to transmit the digital data signal via the optical light source. The electromagnetic radiation source configured to transmit the wireless digital data signal and the wireless power signal can be the same source.

In some embodiments the key identifier further includes one or more private identifiers that are not readily accessible to a user of the apparatus, and one or more public identifiers that are readily accessible to a user of the apparatus. The electronic access apparatus can be configured to transmit at least one private identifier and at least one public identifier to the electronic lock.

In some embodiments, the housing can include a display, the display having a user interface having a visual indication of a status of the electronic lock, and one or more control elements configured to control the operation of the electronic lock. The processor can be configured to transmit a lock instruction to the electronic lock based on an input received from a user. The electronic access apparatus can be a cellular phone, a dedicated electronic key, or other electronic apparatus. In some embodiments, the apparatus does not have a mechanical configuration that is configured to match a mating mechanical configuration of the electronic lock.

In an embodiment of an electronic lock, the electronic lock includes a lock housing and a lock mechanism electrically connected to the lock controller. The lock mechanism can be configured to actuate between a locked state and an unlocked state. The lock also includes an electromagnetic radiation receiver configured to receive a wireless digital data signal from the electronic apparatus, and receive a wireless power signal from the electronic apparatus. The lock can also include a memory device storing key access information, a lock microcontroller configured to control operation of the lock mechanism based on the digital data signal from the electronic apparatus, and a power management module configured to provide power to actuate the lock mechanism based on input received from the lock microcontroller and an electrical energy level contained in an electrical circuit of the electronic lock. The lock mechanism is capable of actuating between the locked state and the unlocked state without any electrical conductor power connection to the electronic lock. The electromagnetic radiation provided by an electronic apparatus and/or optical light incident on the electromagnetic radiation receiver are the only sources of electric power for the electronic lock.

In some embodiments, the digital data signal comprises a key identifier, and lock microcontroller can be configured to determine whether the key identifier matches the key access information stored in the memory device. The lock mechanism can be capable of actuating between the locked state and the unlocked state with less than or equal to about 10 milliwatts of electric power, and the electronic apparatus can be greater than 0.5 centimeters from the electronic lock when providing the electric power. In some embodiments, the electronic lock does not have a mechanical configuration that is configured to match a mating mechanical configuration of the electronic apparatus.

In some embodiments, the power management module can be configured to actuate the lock after the electrical energy level of the electronic lock satisfies an electrical energy level threshold. The power management module can be configured to increase the voltage to actuate the lock. The power management module can include a voltage conversion circuit that is configured to increase a voltage value to operate within the minimum and maximum parameters of the lock mechanism that allow the lock mechanism to actuate. For example, in one embodiment, the voltage conversion circuit is configured to increase a voltage value that is not greater than 2.7 volts to a voltage value between 3.6 volts and 6.8 volts.

In some embodiments, the electromagnetic radiation receiver can have various configurations. For example, the electromagnetic radiation receiver can include a photovoltaic cell, configured to convert electromagnetic radiation to energy to power the lock microcontroller. The electromagnetic radiation receiver can include an electromagnetic radiation sensor, and a signal processing circuit, wherein the signal processing circuit is configured to process a digital data signal received from the electronic apparatus. The electromagnetic radiation can be optical light. The electromagnetic radiation receiver can include an antenna configured to receive radio frequency signals. The antenna can be configured to receive the digital data signal and the power signal from the electronic apparatus. The antenna can be configured to receive the power signal from the electronic apparatus via contactless inductive coupling.

In some embodiments, the lock mechanism can be configured to toggle between a locked state and an unlocked state based on a lock instruction received from the electronic apparatus. The lock mechanism can be configured to actuate from the locked state to the unlocked state for a defined time period before returning to the locked state, such as a defined time period of less than or equal to about five seconds. In some embodiments, the lock memory device and the lock microcontroller are contained on a single integrated circuit.

Some embodiments provide a method of controlling access to an electronic lock having no independent power supply. The method includes receiving, by an electromagnetic radiation receiver, electromagnetic radiation from an electronic apparatus including a power signal configured to provide power to the electronic lock. The method also includes booting a lock microcontroller after the electrical energy level satisfies a microcontroller electrical energy level threshold and receiving, by the electromagnetic radiation receiver, electromagnetic radiation comprising a digital data signal from the electronic apparatus including a key identifier. The method also includes determining, by the lock controller, whether the key identifier matches key access information stored in memory in the electronic lock and storing power received from the electronic apparatus in an electric circuit, such a reservoir capacitor, in the electronic lock. If the key identifier matches the key access information, actuating a lock mechanism when the stored power reaches an energy level threshold. The lock mechanism can be configured to actuate between a locked state and an unlocked state and vice versa.

In some embodiments, the method also includes shutting down the lock microcontroller if the key identifier does not match the key access information. The electronic apparatus does not need to mechanically or physically make contact to the electronic lock to transfer the digital data signal and the power signal.

In an embodiment of an electronic lock capable of being locked and unlocked with a handheld electronic apparatus, the electronic lock can include a lock mechanism electrically connected to a lock microcontroller. The lock mechanism can be configured to actuate between a locked state and an unlocked state. The electronic lock can also include an electromagnetic radiation receiver configured to receive an electromagnetic wireless digital data signal from the electronic apparatus, and receive an electromagnetic wireless power signal from the electronic apparatus. The receiver can be configured to output electric power at a first voltage. The lock microcontroller can be configured to control operation of the lock mechanism based on the digital data signal from the electronic apparatus. The electronic lock can also include at least one capacitor electrically connected to receive electric power from the electromagnetic radiation receiver. The electronic lock can also include a power management module can be configured to receive electric power from the at least one capacitor at the first voltage and output the electric power at a second voltage and supply the electric power to the lock mechanism over the actuation time period to actuate the lock mechanism based on input received from the lock microcontroller. The second voltage can vary over an actuation time period and the lock mechanism can actuate between the locked state and the unlocked state using only the electric power supplied by the wireless power signal.

In another embodiment of an electronic lock capable of being locked and unlocked with a handheld electronic apparatus, the electronic lock includes a lock mechanism electrically connected to a lock microcontroller. The lock mechanism can be configured to actuate between a locked state and an unlocked state. The electronic lock can also include an electromagnetic radiation receiver configured to receive an electromagnetic wireless digital data signal from the electronic apparatus, and receive an electromagnetic wireless power signal from the electronic apparatus. The lock microcontroller can be configured to control operation of the lock mechanism based on the digital data signal from the electronic apparatus. The electronic lock can also include at least one capacitor electrically connected to receive electric power from the electromagnetic radiation receiver. The electronic lock can also include a power management module configured to provide power to actuate the lock mechanism based on input received from the lock microcontroller and an electrical energy level of the capacitor. The voltage of the electric power supplied to the lock mechanism can vary during a period of time while the lock mechanism is actuated. The at least one capacitor, the lock microcontroller, the power management module, and the lock mechanism can be configured to use a combined total of electric energy less than or equal to 100 millijoules in order to actuate the lock mechanism between the locked state and the unlocked state.

In an embodiment of a method of locking or unlocking an electronic lock using a handheld electronic apparatus, the method including receiving, by an electromagnetic radiation receiver, electromagnetic radiation from the handheld electronic apparatus. The the electromagnetic radiation includes a power signal configured to provide electric power to the electronic lock. The method can also include booting a lock microcontroller after an electrical energy level satisfies an electrical energy level threshold, receiving, by the electromagnetic radiation receiver, electromagnetic radiation comprising a digital data signal from the electronic apparatus, and charging at least one capacitor in the electronic lock during a first period of time using the electric energy received from the electronic apparatus. The at least one capacitor can receive the electric energy from the electromagnetic radiation receiver at a first voltage. The method can also include receiving, by a power management module, electric power from the at least one capacitor based on a lock actuation instruction to actuate the lock mechanism received from the lock microcontroller. The power management module can receive the electric energy from the at least one capacitor at a first voltage. The method can also include supplying, by a power management module, the electric power to the lock mechanism at a second voltage to actuate the lock mechanism between a locked state and an unlocked state. The second voltage can be higher that first voltage for a second period of time, wherein the second voltage varies over the second period of time; and wherein the lock mechanism is configured to actuate using electric power received only from the power signal during transmission of the power signal.

For purposes of summarizing the embodiments, certain aspects, advantages, and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

A general architecture that implements the various features will now be described with reference to the drawings. The drawings and the associated descriptions are provided to illustrate embodiments of the invention and not to limit the scope of the invention. Throughout the drawings, reference numbers are reused to indicate correspondence between referenced elements.

DETAILED DESCRIPTION

Figure 1:
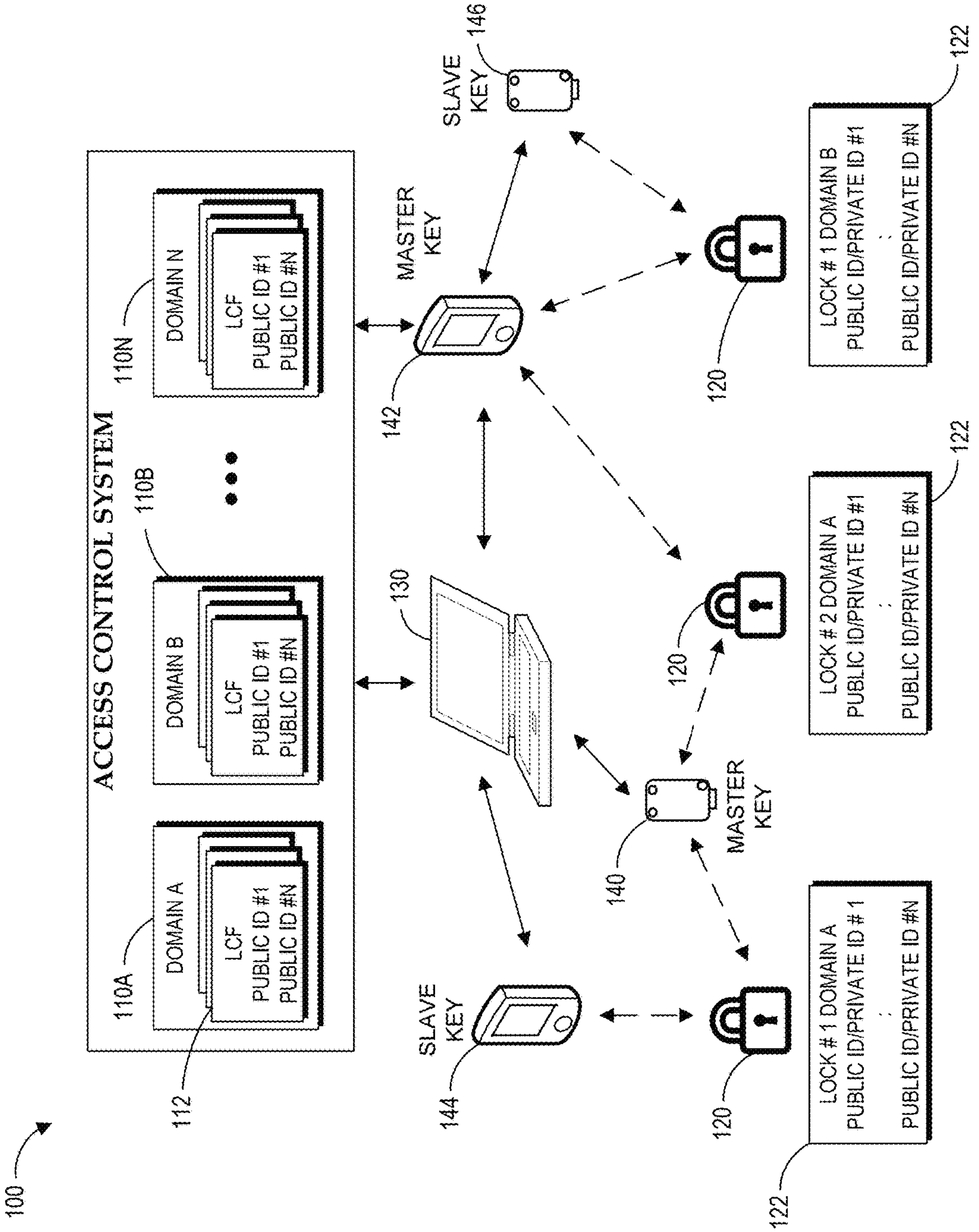
FIG. 1 illustrates an example embodiment of an operating environment for an access control system.

Systems and methods that represent various embodiments and example applications of the present disclosure will now be described with reference to the drawings.

For purposes of illustration, some embodiments are described in the context of access control systems and methods incorporating a wireless communication connection. The wireless connection can be configured to comply with one or more wireless standards, such as, for example, RFID, Near Field Communication (NFC), Bluetooth, Bluetooth Smart, IEEE 802.11 technical standards ("WiFi"), and so forth. In some embodiments, a Universal Serial Bus (USB) connection is used. The USB connection can be configured to comply with one or more USB specifications created by the USB Implementers Forum, such as, for example, USB 1.0, USB 1.1, USB 2.0, USB 3.0, USB On-The-Go, Inter-Chip USB, MicroUSB, USB Battery Charging Specification, and so forth. The embodiments disclosed herein are not limited by the type of connection employed by the systems and methods. At least some of the systems and methods may be used with other connections, such as, for example, an IEEE 1394 interface, a serial bus interface, a parallel bus interface, a magnetic interface, a radio frequency interface, a wireless interface, a custom interface, and so forth. The system may include a variety of uses, including but not limited to access control for buildings, equipment, file cabinets, safes, doors, suitcases, padlocks, etc. It is also recognized that in other embodiments, the systems and methods may be implemented as a single module and/or implemented in conjunction with a variety of other modules. The embodiments described herein are set forth in order to illustrate, and not to limit, the scope of the invention.

The access control system as contemplated by at least some embodiments generally includes an electronic lock and an electronic access apparatus. The electronic access apparatus can also be referred to as an electronic key or a smart phone. The electronic lock and the electronic access apparatus are configured to communicate with each other via a wireless interface without a mechanical interface. The electronic lock can include, for example, an electronic lock mechanism, such as a latch or motor, an electronic access interface or connector, a controller (e.g., a microcontroller), program modules, nonvolatile memory including lock configuration information, key access information, an access log, and other information stored thereon, other mechanical and/or electrical components. In some embodiments, the electronic lock mechanism can include, for example, a piezoelectric latch or another type of energy-efficient latch, motor, or actuator. The wireless interface can include, for example, antennas, sensors, photovoltaic cells, radio frequency identification (RFID) and near field communication (NFC) interface components, signal processing components (e.g., a signal processing circuit), and/or other wireless interface components. Functional components can be integrated into a single physical component. For example, the memory of the lock may be embedded on the same integrated circuit as the controller.

In some embodiments, the electronic access apparatus can include, for example, a wireless transceiver, an electromagnetic signal source (e.g., a light source or radio frequency generator), a key housing, a microcontroller, program modules, a lock interface or connector, a power source, a memory card slot, a memory device having one or more key identifiers, lock configuration files containing key access information for a lock, mechanical and/or other electrical components. Some embodiments of the electronic access apparatus can also include a battery, a battery charger, a digital bus connector, circuitry to detect when the electronic access apparatus is used with another device, memory integrated with the microcontroller, a storage device controller, a file system, operation system, and/or program logic for determining what actions to perform in response to conditions or events. In some embodiments the electronic access apparatus can be a general purpose computing device, such as, for example, a cellular phone, a smart phone, a tablet computer, a laptop, or other computing device. In some embodiments, the electronic access apparatus can be a dedicated electronic access device, where the primary purpose of the device is to provide access to one or more electronic access systems.

In some embodiments, the access control system includes an application program for managing access between electronic locks and electronic keys. The access control system can operate on one or more computing systems. In some embodiments, the access control system can be configured to operate in a distributed network environment. The access control system can be used to create domains and/or lock configuration files. The files can be stored on electronic keys, and or other computing devices. In some embodiments, the access control system can manage a plurality of domains so that key access information for groups of electronic locks and keys to be managed more efficiently. For example, a domain can include access control information for a plurality of locks and keys, while an individual lock configuration file may contain access control information for a single lock in the domain.

FIG. 1 illustrates an example embodiment of an access control system 100 configured to have a plurality of domains 110A-N. Each domain 110 is associated with a controlled access environment, such as, for example, a residence, an office building, or other defined environment. The domain 110 can include one or more locks 120, such as, for example, pad locks, door locks, cabinet locks, equipment locks, or other types of locks. The domains 110 can have a lock configuration file 112 associated with each lock 120. The lock configuration files 112 can store the public identifiers or private identifiers associated with each lock. Each lock 120 can have a key access information file 122. The key access information 122 can store public identifiers and private identifiers. A different access control system can be associated with each master key.

In the embodiment shown in FIG. 1, master keys 140, 142 are associated with the first domain 110A and master key 142 is also associated with the second domain 110B. Master keys have privileges to perform administrative functions on the locks in a domain. For example, in some embodiments, master keys can access, erase, program, or reprogram locks in a domain. Thus, the master keys 140, 142 in the first domain 110A are able to perform any of the master key functions on locks 120A, 120B. Master keys can also have administrative privileges in other domains. For example, master key 140 can access lock 120C in the second domain 110B. However, in some embodiments master key may not have administrative privileges in more than one domain, such that the master key can only access the locks but not erase, program, or reprogram the lock and act as a slave key.

The domains can have slave keys 144, 146. Slave keys can have privileges to access one or more locks in a domain but do not have privileges to perform administrative functions. In some embodiments, an access control system administrator can set up a domain such that slave keys have access to only a portion of the locks in a domain. In some embodiments, a slave key can have access privileges to locks in multiple domains.

The master keys and slave keys can wirelessly communicate with the locks using electromagnetic signals. The computing devices, master keys and slave keys can also wirelessly communicate with each other via a wireless communication protocol, such as Bluetooth, NFC, RFID, WiFi, cellular, or other wireless communication protocol that uses electromagnetic signals for purposes of synchronizing domain and lock configuration files via the application. The electromagnetic signals may take any suitable form, such as radio frequency (RF) signals, light signals, etc. In some embodiments, the keys can physically couple to the lock using an appropriate physical connector such as a USB connector.

In some embodiments, each of the domains 110A-N is associated with a domain file. The domain file can contain information associated with a domain of the access control system 100, including, for example, key users and locks in a domain. One or more lock configuration files 112 can also be associated with each domain. In some embodiments, a lock configuration file contains key access information associated with an electronic lock. The domain file can be created or modified by an access control administration application program (an "admin application"). In some embodiments, the administrative application and the domain file can be stored on a master key 142, such as an electronic access apparatus (e.g., a cell phone or electronic key), on a computer 130, or on both. In some embodiments, master keys have administrative privileges only in the domains in which they are assigned. In some embodiments, master keys and slave keys can have access privileges for locks in any domain. A domain file can be password protected to increase the security of an access control system. In some embodiments, a person possessing a master key is allowed to use the admin application to modify the domain file and lock configuration files on the master key. For example, the person could reconfigure the domain file and lock configuration files to remove other master keys from the domain. In some embodiments, the user can directly edit domain files and lock configurations via an application on the computing device or directly with the electronic access apparatus (e.g., an app on a smart phone). However, in some embodiments, a person must also know a domain password in order to be able to modify the domain file and lock configuration files or access the application. In this embodiment the access control system 100 can be stored locally on the electronic apparatus (e.g., key, smart phone, computer). The electronic apparatus can communication via a wired or wireless connection to program and synchronize of the master and slave keys devices. In some embodiments, the master key does not have to communicate with the slave key. The master key can update the lock with the slave key public identifier (e.g., a phone number) and the slave key can then update its private identifier to the lock upon a first access. The slave key can do this without interacting with the master key.

Figure 2:
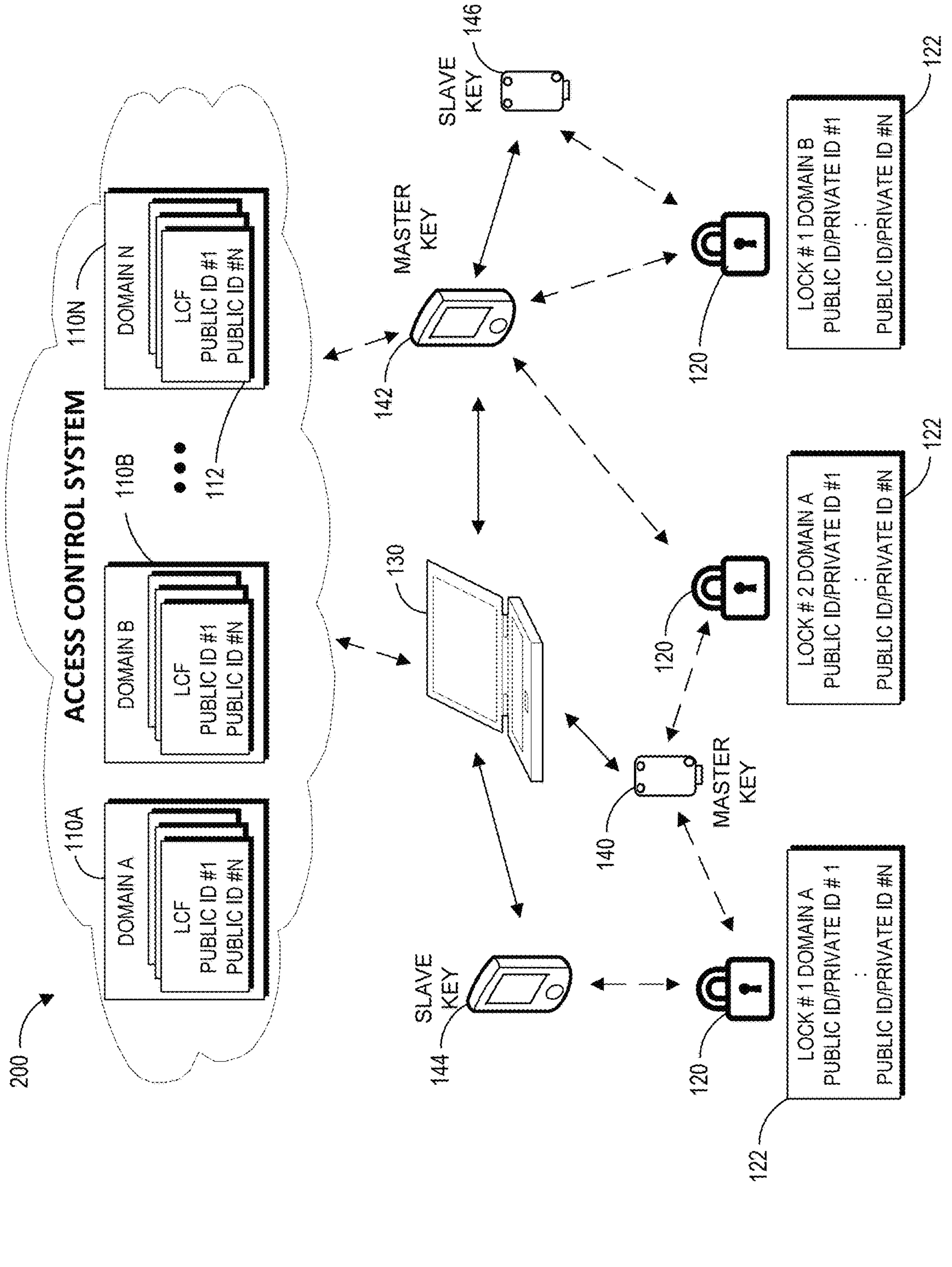
FIG. 2 illustrates an example embodiment of an operating environment for an access control system in a distributed networking environment.

FIG. 2 illustrates an embodiment of and access control system 200 operating in a distributed operating environment (e.g., a cloud-based system). In the distributed operating environment, the master keys and slave keys function in the same manner as described in association with FIG. 1. However, in the distributed operating environment, the access control system 200 is accessible over a network using an account-based system. The account-based system allows computing device to access the access control system information over a network (e.g., the Internet). The access control system 200 stores domain information, associated lock configuration files, and other associated information on a remote computing device, such as a server. The access control system 200 has a network-based user interface that allows a user to login to an account. The account can be an administrator account, also referred to as a master account or a user account. The account can have one or more domains associated with the account. Each domain can have one or more locks associated with the account. An account with administrator privileges for a domain can manage the domain and lock configuration files. The access control system 200 can be used to provide the files onto a local computing device in order to program and access the locks within a domain.

The access control system can use public identifiers and private identifiers to determine access to the locks. Additional information regarding using public identifiers and private identifiers is provided in U.S. Pat. Nos. 8,035,477, and 8,339,239, which are incorporated by reference in its entirety.

Figure 3:
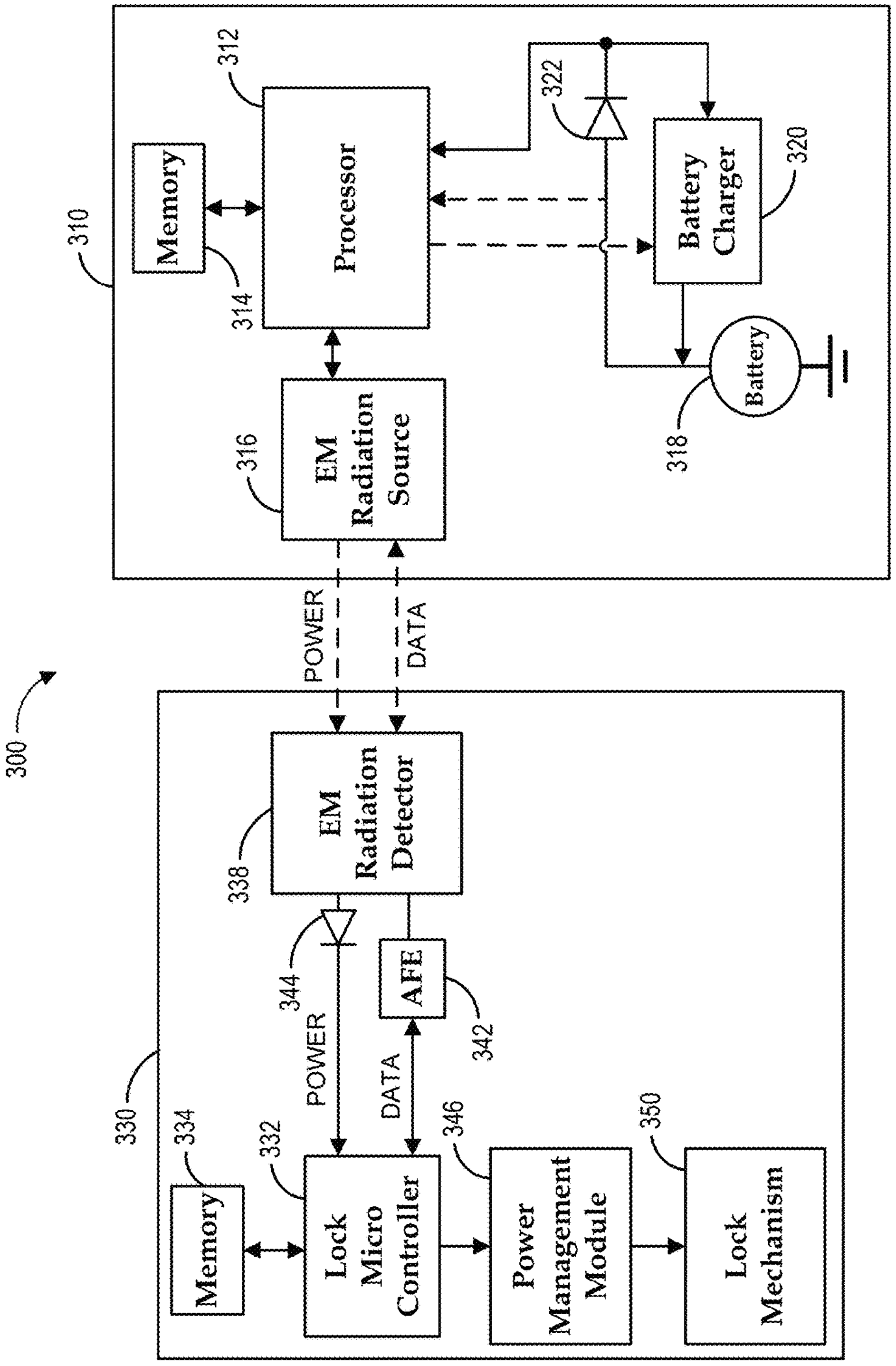
FIG. 3 is a detailed block diagram of an embodiment of an electronic lock and an electronic access apparatus.

FIG. 3 is a block diagram of an embodiment of an electronic lock and key system 300 including an electronic access apparatus 310 and an electronic lock 330. The electronic access device 310 can include a housing that contains a processor 312 that is connected to a memory 314. The electronic access device 310 can be a dedicated electronic key (e.g., a single purpose computing device), a mobile computing device, such as a cellular phone, a smart phone, or other computing device capable of communicating with the electronic lock 330. In some embodiments, the processor is a microcontroller 312. The memory 314 can be a nonvolatile memory device, such as NAND flash memory. The memory 314 can also include a memory card or other removable solid state media such as, for example, a Secure Digital card, a micro Secure Digital card, etc. The microcontroller 312 can also have an optional integrated memory (not shown). In some embodiments, the electronic access device 310 can include a display. The display can be a LED, LCD, touch screen display, or other type of display. In some embodiments, the electronic access device 310 can have one or more buttons or controls can be configured to operate the electronic access device 310. In some embodiments, the buttons or controls can be integrated into the display.

The processor 312 forms part of a circuit that can include a diode 322, such as a Schottkey Diode, a battery charger 320, a battery 318, and other circuit components such as resistors, a ground plane, pathways of a lock connector, and other pathways. In one embodiment, the electronic access apparatus 310 includes an external lock connector, such as, for example, a physical connector that is compatible with a USB connector.

The battery 318 can be any suitable rechargeable battery, such as, for example, a lithium-ion battery, and can be configured to provide a suitable electric potential, such as, for example, 3.7 volts. The battery 318 can be placed between a ground, such as Pin 4 of the USB connector, and a diode 322. The electronic access apparatus can also include a detection circuit. For example, a reference integrated circuit or a Zener diode or voltage reference derived from the power bus feeding (or Pin 1) can be provided to a reference input for a comparator. The diode 322 can be a diode with a low forward voltage drop, such as, for example, a Schottky diode, an energy efficient diode, or another type of diode. In some embodiments, another type of switching device can be used in place of the diode 322. The diode 322 is oriented to allow current to flow from the battery 318 to the electrical input of the microcontroller 312 and the battery charger 320. The output of a detection circuit can be connected to a computer mode interrupt or reset of the key microcontroller.

The electronic access apparatus 310 includes an electromagnetic radiation source 316 that is configured to transmit electromagnetic radiation, such as radio frequency signals, optical light signals, and other electromagnetic radiation. The electromagnetic radiation source 316 can be an optical light source, such as a light on a cellular phone, flashlight, an antenna, or other source capable of transmitting electromagnetic radiation. In some embodiments, the electromagnetic radiation source can transmit and receive electromagnetic radiation. For example, in some embodiments the electromagnetic radiation source 316 can be configured to send and receive signals based on radio frequency identification (RFID) and near field communication (NFC) standards. In some embodiments, a photocell, antenna, or sensor can be used to receive data transmitted by an electromagnetic radiation receiver 338 on the electronic lock 330.

The electromagnetic radiation source 316 is configured to transmit a power signal and a wireless digital data signal to the electronic lock 330. The electromagnetic radiation source 316 is configured to transmit a power signal to the electromagnetic radiation receiver 338 on the electronic lock 330. The wireless digital data signal is configured to communicate information for accessing and programming the lock 330. If the electronic access apparatus 310 is a master key, the digital data signal can include information such as a key access information file that is used to program the electronic lock. If the electronic access apparatus 310 is a slave key or a master key being used to access the electronic lock, the digital data signal can include key identifiers, such as a public identifier and a private identifier. In some embodiments, one or more, public and private identifiers can be sent to the electronic lock. In some embodiments, only the private identifier or identifiers are sent. The digital data signal can include a lock instruction that instructs the lock 330 to lock, unlock, or temporarily unlock. In some embodiments, the lock 330 toggles the current state of the lock (e.g., from lock to unlock or visa-versa) without receiving a lock instruction from the key 310.

The electromagnetic radiation source 316 is configured to transmit a wireless power signal to the electronic lock to provide power to the electronic lock sufficient to actuate a lock mechanism 350 within the electronic lock 330. The power signal from the electronic access apparatus 310 is capable of actuating the electronic lock 330 even when there is no electrical conductor power connection to the electronic lock. In other words, the electronic lock is not physically connected to a permanent power supply (e.g., electrical mains or a battery). In some embodiments, the key 310 is the only source of electric power for the electronic lock. In some embodiments, the key 310 and/or light incident on a photovoltaic cell electrically connected to the electronic lock are the only sources of electric power for the electronic lock. In certain embodiments, the electronic access apparatus 310 does not have an electric power transmission interface that mechanically mates with a specific electric power reception interface of the electronic lock.

In some embodiments, the electronic access apparatus 310 can include a display with a user interface (e.g., a screen on a mobile phone) that displays a visual indication of a status of the electronic lock. The display can have control elements that are configured to control the operation of the electronic lock. For example, the user display can have buttons for a user to access the lock 330, such as lock, unlock, and temporarily unlock commands. The display can also be used to perform other administrative functions on the lock, such as programming the lock. A dedicated electronic key may have physical buttons that the user can press. In some embodiments, the dedicated electronic key can have one or more light-emitting diodes that display the current status of the lock. In some embodiments, the electronic apparatus does not use buttons to access or program a lock. Rather, the electronic apparatus can automatically access and program the lock.

The electronic lock 330 includes memory 334, a lock microcontroller 332, an electromagnetic radiation receiver 338, a power management module 346, and an electronic latch 350. In some embodiments, the memory 334 and power management module 346 can be incorporated into the microcontroller 332. The electronic lock 330 can include electric circuitry that includes a Schottky diode 344 between the microcontroller 332 and the electromagnetic radiation receiver 338. The electronic lock can include a signal processing circuit 342. The memory 334 can be a nonvolatile memory device, such as NAND flash memory. The microcontroller 332 can also have an integrated memory.

The electromagnetic radiation receiver 338 can be hardware configured to receive electromagnetic radiation. For example, the electromagnetic radiation receiver 338 can be an antenna, a photovoltaic cell, a sensor, or other component capable of receiving electromagnetic radiation. The electromagnetic radiation receiver 338 is configured to can comprise one or more components. The electromagnetic radiation receiver 338 is configured to receive, at least, a wireless digital data signal, and a wireless power signal from an electronic access apparatus 310. The power signal and the data signal can be discrete signals that are received and processed separately. In some embodiments, the power signal is superimposed on the digital data signal. In some embodiments, the power signal and the data signal can be integrated into the power signal by pulsing the electromagnetic radiation on and off, the data can be modulated in the frequency-domain, time-domain, spatially, or in any combination. The electromagnetic radiation can be demodulated by the receiver on the electronic lock 330. The power signal can be received and be transferred to the microcontroller 332 through the diode 344. In some embodiments, electronic lock does not include the diode 344. The data signal can be received and processed, or demodulated by the signal processing circuit (Analog Front End (AFE)) 342. In some embodiments, the AFE 342 and electromagnetic radiation receiver 338 can be integrated into the same unit. The signal processing circuit can process and filter or demodulate the digital data signal before it is received by the microcontroller 332.

In some embodiments, the electromagnetic radiation receiver 338 can comprise multiple detector elements. For example, there can be a detector element that is configured to receive the data signal and a different detector element that is configured to receive the power signal. In one embodiment, the electromagnetic radiation receiver is a photovoltaic cell that is configured to receive the data signal and the power signal from the electronic access apparatus 310. A photovoltaic cell is configured to convert electromagnetic radiation (e.g., optical light) to energy to power the lock microcontroller. The electromagnetic radiation detector 338 can receive data signals via the electromagnetic radiation receiver 338. In some embodiments, the electromagnetic radiation detector can comprise a transceiver that can transmit and receive electromagnetic radiation. In some embodiments, the electronic access apparatus 310 can be greater than 0.5 centimeters from the electronic lock 330 when providing the power signal to the electromagnetic radiation receiver 338. In some embodiments the distance from the electromagnetic radiation receiver 338 can be less than or equal to about four centimeters, and in some embodiments, less than or equal to about ten centimeters. In some embodiments, the electronic lock 330 has a receiver mechanical configuration that need not match a mated transmitter mechanical configuration of the electronic access apparatus 310 in order to receive the power signal or data signal. The wireless power signal is configured to provide power for powering all the circuits, including the microcontroller 332, the power management module 346, and the lock mechanism 350.

The microcontroller 332 is configured to control operation of the lock mechanism based on the digital data signal received from the key 310. The microcontroller 332 can determine whether the key identifiers received from the key match the key access information stored in memory. The microcontroller 332 can send a signal to the lock mechanism 350 to actuate the lock if the key identifiers match. The microcontroller 332 can also receive key instructions for operating the lock, such as lock, unlock, or temporary unlock, from the electronic access apparatus 310. In some embodiments, the microcontroller can operate the lock mechanism without specific key instructions. For example, the microcontroller can toggle the lock from a locked state to an unlocked state or visa-versa. The microcontroller 332 can also default to a temporary unlock state rather than toggling the state of the lock.

In operation, the microcontroller 332 can boot up automatically when a sufficient amount of power is received from the power signal to satisfy a power threshold. In some embodiments, a boot up circuitry can be used to monitor the power level until a threshold voltage is satisfied, as microcontrollers can sink most of the current during the bootup phase. In one embodiment, a power-on-reset device can be used to measure the boot threshold and the microcontroller via an analog switch. After the microcontroller boots, the power-on-reset device can be shutdown to reduce overall system power consumption. The lock microcontroller 332 can communicate with the processor 312 via data signals that are transmitted and received by the electromagnetic radiation receiver 338.

In some embodiments, a digital data signal can cause the microcontroller 332 to enter a lock connection mode. When in the lock connection mode, the key processor 312 can communicate with the lock microcontroller 332 via the second electromagnetic radiation receiver. When certain criteria are satisfied, the lock microcontroller 332 can perform various operations, such as, for example, erasing a lock memory or replacing key access information stored in the lock memory 334.

The power management module 346 and/or microcontroller 332 can monitor the electrical energy level in the lock 330 and determine when the electrical energy level satisfies a specific threshold. The power management module 346 can provide power to actuate the lock mechanism 350 after the electrical energy level of the electronic lock satisfies an electrical energy level threshold. For example, the electrical energy can be stored in one or more capacitors in the electronic lock 330. The electrical energy can be stored within the capacitors at a first voltage, based on an output voltage of the front end 442. The time period in which the capacitors are charging can be referred to a charging mode, or a first mode of operation. During the charging mode, the micro controller 332 can continue to authenticate the access device as the capacitors continue to store the electrical energy received from the power signal of the electronic key 310. The power management module 346 and/or microcontroller 332 can monitor the charge of capacitors within an electric circuit and, when the microcontroller authenticates the electronic key and the charge satisfies the charge-based threshold, the microcontroller can instruct the power management module to provide power to the lock mechanism in order to actuate the lock mechanism. In some embodiments, the threshold can be a time-based threshold, in which the threshold is based on an amount of time that has after powering up the microcontroller. When the determined threshold has been satisfied, the electronic lock can transition from the charging mode to the actuation mode.

In some embodiments, the power management module 346 can utilize an electric circuit that is configured to increase the voltage above the voltage level of the power signal. For example, in one embodiment, the electric circuit can be configured to increase a voltage value that is not greater than 2.7 volts to a voltage value between 3.6 volts and 6.8 volts. In some embodiments, the power management module can use switches and capacitors to double or triple the voltage. This can be more efficient than using a power regulator such as a switching regulator, which has significant switching losses. The configuration of the power management module 346 can minimize power waste by only using one switch cycle to increase the voltage.

The lock mechanism 350 can be an electronic latch. The lock mechanism 350 can actuate between a locked state and an unlocked state based on a signal received from the microcontroller 332. The lock mechanism 350 can toggle between the locked and unlocked state. In other words, the lock mechanism 350 can change the state of the lock mechanism from locked to unlocked, or visa-versa. The lock will remain in the new state permanently without power, or until it has received another command from the microcontroller 332. In some embodiments, the lock mechanism 350 can have a temporary unlock state. In the temporary unlock state; the lock mechanism 350 actuates the lock from the locked state to the unlocked state for a defined period of time. The defined period of time can be one second, two seconds, 5 seconds, or other period of time that the actuator can sustain based on the power provided by the electronic access apparatus 310. This period of time can be determined by size of the reservoir capacitor, efficiency of the sensor, and the strength of the wireless power signal. After the defined period of time, the lock mechanism 350 reverts back to the locked state. The lock mechanism can be a small efficient motor, piezoelectric latch or another style of latch or actuator that permits a relatively small amount of energy to actuate the latch. For example, the lock mechanism 350 may include a Servocell AL1 or AL3, an actuator available from Rutherford Controls.

The power signal provided by the electronic access apparatus 310 provides power to actuate the key mechanism 350. In some embodiments, the lock mechanism 350 is capable of actuating between the locked state and the unlocked state with less than or equal to about 10 milliwatts total lock system power consumption. The peak power usage of the capacitor(s), the lock microcontroller 332, the power management module 346, and the lock mechanism 350 during actuation of the lock can be less than or equal to about 120 milliwatts. In some embodiments, the microcontroller 332 can use less than or equal to 1 miiliwatt of power, less than or equal to 5 milliwatts of power, or less than or equal to 10 milliwatts of power. In some embodiments, the power management module 346 can use less than or equal to 0.5 milliwatts, less than or equal to 1 milliwatt, or less than or equal to 5 milliwatts. In some embodiments, the lock mechanism 350 can use less than or equal to 75 milliwatts, less than or equal to 90 milliwatts, less than or equal to 100 milliwatts, or less than or equal to 120 milliwatts.

The capacitor(s), the lock microcontroller 332, the power management module 346, and the lock mechanism 350 are configured to use a combined total of electric energy less than or equal to 100 millijoules in order to actuate the lock mechanism between the locked state and the unlocked state or vice-versa. In some embodiments, the combined total energy usage can be less than or equal to 20 millijoules, less than or equal to 25 millijoules, or less than or equal to 50 millijoules. In some embodiments, the combined total energy usage can be between 10 and 20 millijoules.

In some embodiments, the total energy consumption of the lock microcontroller 332 can be less than or equal to 3 millijoules, less than or equal to 5 millijoules, less than or equal to 10 millijoules, or less than or equal to 25 millijoules. In some embodiments, the total energy consumption of the power management module can be less than or equal to 1 millijoules, less than or equal to 2 millijoules, less than or equal to 3 millijoules, or less than or equal to 5 millijoules. In some embodiments, the total energy consumption of the lock mechanism can be less than or equal to 15 millijoules, less than or equal to 20 millijoules, less than or equal to 25 millijoules, or less than or equal to 50 millijoules.

In some embodiments, actuation of the lock mechanism can be accomplished by storing electrical energy in one or more capacitors and increasing a first voltage output from the capacitor(s) to a second voltage output that is within the limits of the lock mechanism. The second voltage output can be the same or greater than a voltage of a lock actuation threshold of the lock mechanism 350. When the lock mechanism draws power, the latch can actuate before the voltage drops below the actuation threshold. In one embodiment, the piezo latch mechanism can initially draw up to 15 mA for approximately 50 ms to 75 ms in order to change states. One or more capacitors can be used to store energy and to provide the initial supply of current. In one embodiment, the electronic lock can use two capacitors in order to supply the sufficient amount of current to actuate the lock mechanism. In some embodiments, the electronic lock does not include a voltage regulator. In some embodiments, the power management module can be integrated into the microcontroller.

Figure 4:
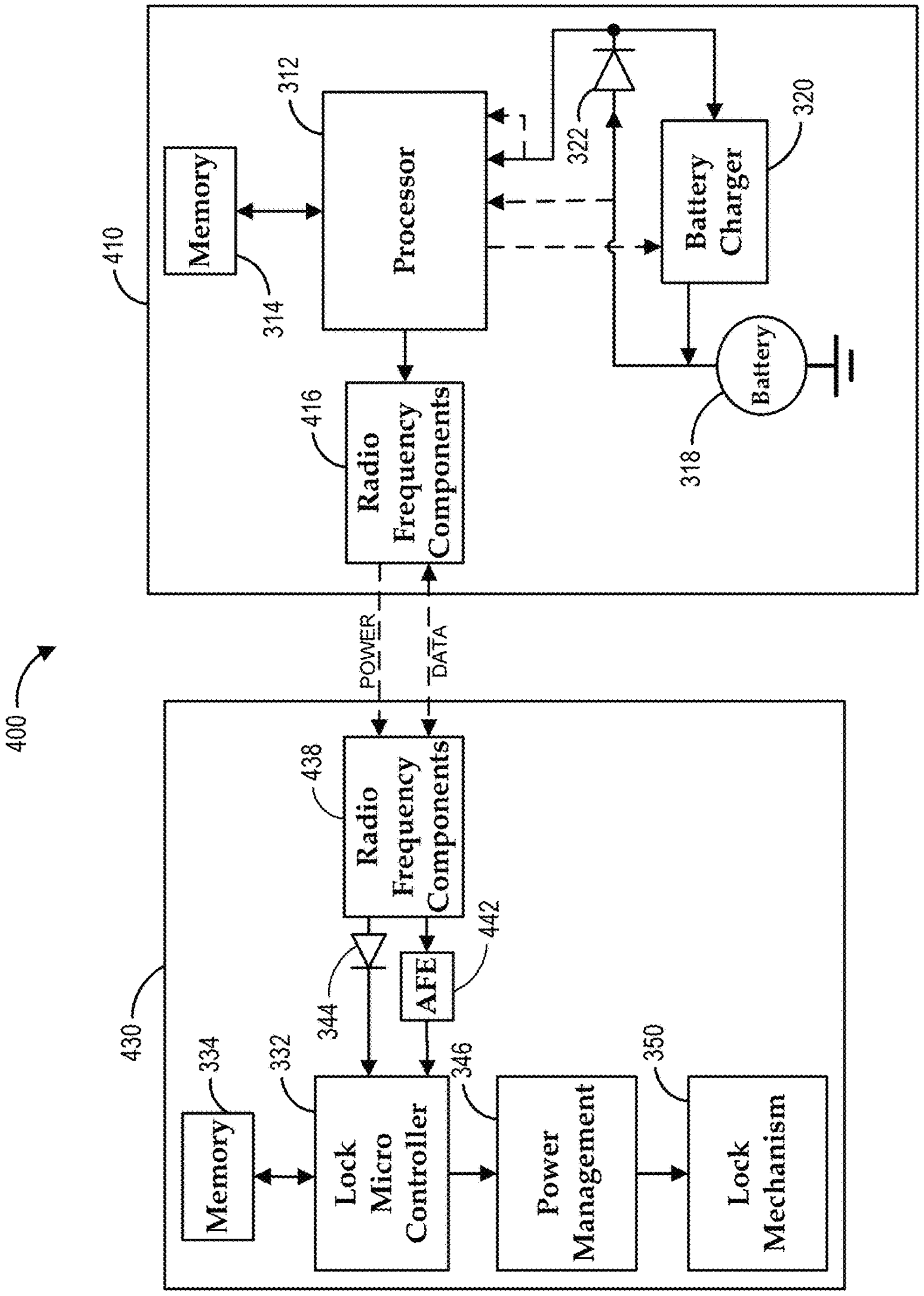
FIG. 4 is a detailed block diagram of another embodiment of an electronic lock and an electronic access apparatus.

FIG. 4 is a block diagram of another embodiment of an electronic lock and key system 400 including an electronic access apparatus 410 and an electronic lock 430. In this embodiment, the electronic key 410 includes a housing that contains a processor 312, memory 314, a battery 318, and a battery charger 320, which are substantially the same as the components having the same reference numbers and described in association with FIG. 3. The electronic lock includes microcontroller 332, memory 334, power management module 346, and lock mechanism 350, which are substantially the same as the components having the same reference numbers and described in association with FIG. 3.

The electronic access apparatus, such as a smart phone or electronic key, 410 also includes radio frequency (RF) components 416 for communicating with the electronic lock 430. In some embodiments, the electronic access apparatus 410 and the electronic lock 430 can use radio frequency identification (RFID) and/or near field communication (NFC) protocols to communicate and provide power. The RF components 416 on the electronic access apparatus 410 can include, for example, an antenna, a transceiver, modulator, and a decoder/demodulator. The electronic lock 430 can include corresponding RF components 438, such as a transponder. Radio frequency based communication can be established between the processor 312 in the electronic access apparatus 410 and the microcontroller 332 in the electronic lock 430. The RF communication can allow the transfer of power between the electronic access apparatus 410 and the electronic lock 430. The power can be transferred via contactless inductive coupling between the electronic access apparatus 410 and the electronic lock 430 In some embodiments, the power transfer can occur when the electronic access apparatus 410 is positioned at up to four centimeters from the electronic lock 430. In some embodiments, it can be up to ten centimeters.

In this embodiment, the power provided by the electronic access apparatus 410 can provide enough power to boot the microcontroller 332, power the power management module 346 and actuate the lock mechanism 350. In order to activate the lock mechanism 350 the power management module 346 may need to increase the voltage of the power signal received from the electronic access apparatus 410. In some embodiments, the power management module can use switches and capacitors to increase the voltage rather than a voltage regulator device. In one embodiment, the voltage value of the power signal is not greater than 2.7 volts and is increased to a voltage value between 4 volts and 6.8 volts in order to actuate the lock mechanism. In some embodiments, the voltage value may not need to be boosted to actuate the lock mechanism. In some embodiments, the receiver can be designed or selected to supply a sufficient amount of voltage and power to the lock. The microcontroller can monitor the voltage threshold and operate within the min and max specifications of the locking mechanism.

Figure 5:
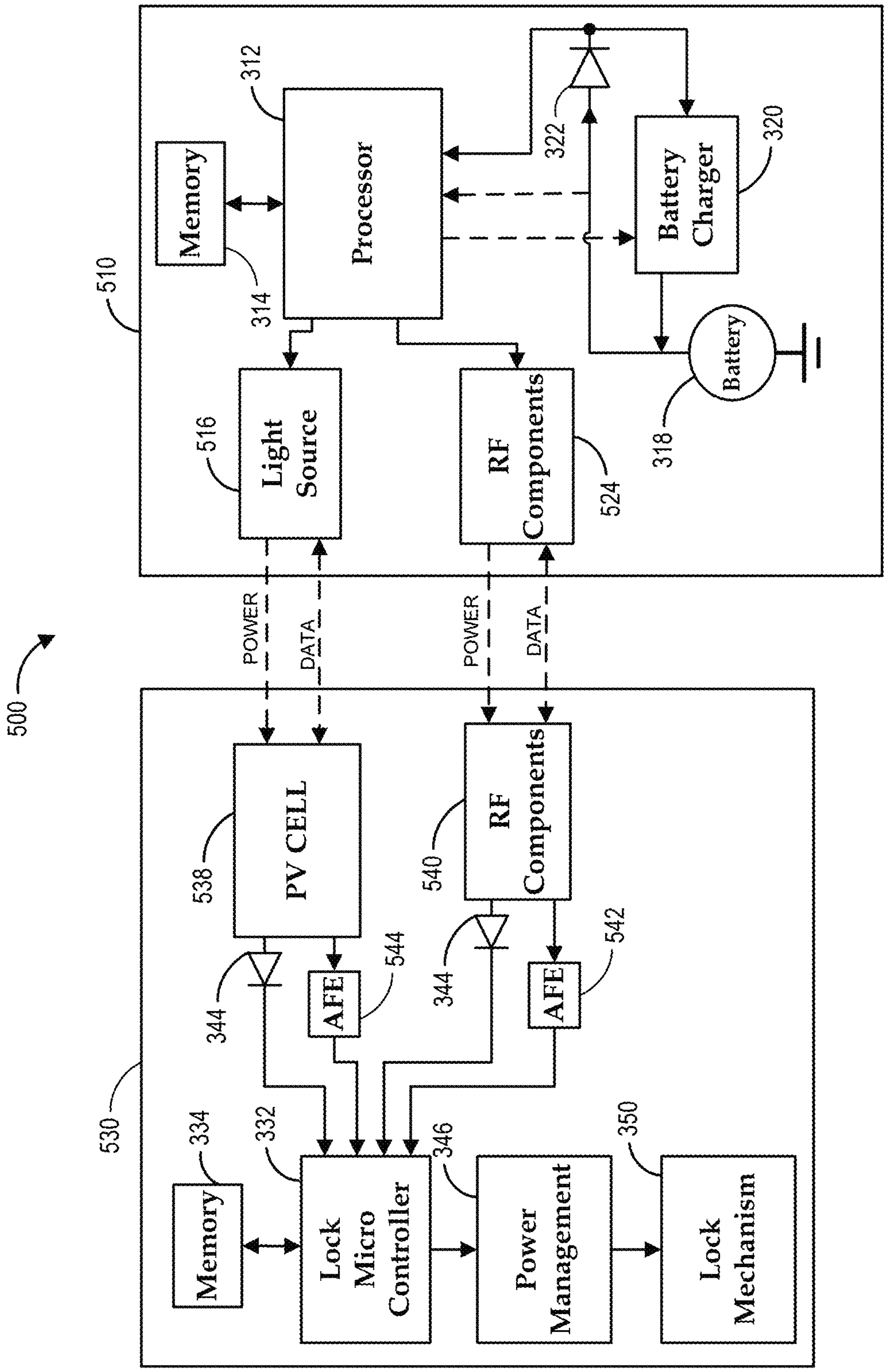
FIG. 5 is a detailed block diagram of yet another embodiment of an electronic lock and an electronic access apparatus.

FIG. 5 is a block diagram of another embodiment of an electronic lock and key system 500 including an electronic access apparatus 510 and an electronic lock 530. In this embodiment, the electronic access apparatus 510 includes a housing that contains a processor 312, memory 314, a battery 318, and a battery charger 320, which are substantially the same as the components having the same reference numbers and described in association with FIG. 3. The electronic lock 530 includes a microcontroller 332, memory 334, power management module 346, and lock mechanism 350, which are substantially the same as the components having the same reference numbers and described in association with FIG. 3.

The electronic access apparatus, such as a smart phone, 510 includes an optical light source 516 and radio frequency components 524. The optical light source 516 is configured to emit optical light from the electronic access apparatus 510 to provide power to the electronic lock 530. The RF components 524 include an antenna and necessary components necessary to emit and receive radio waves. The RF components are configured to transmit digital data signals to the electronic lock 530. The RF components can also receive digital data signals from the electronic lock 530. Combining both RF and PV components can increase the supply of power to the electronic lock 530, which can result in quicker access and/or provide auxiliary power for added features such as an LED or display. In some embodiments, the electronic access apparatus 510 is configured to transmit both power and data signals from the optical light source 516 and the RF components 524. In some embodiments, the optical light source only provides the power signal and the RF components only provide the data signal.

The electronic lock 530 includes a photovoltaic cell 538 and corresponding RF components 540. The photovoltaic cell 538 is configured to convert electromagnetic radiation (e.g., optical light) to energy to power the lock microcontroller 332, the power management module 346, and the lock mechanism 350. The photovoltaic cell 538 can have an associated signal processing circuit 544 to process a digital data signal. The RF components 540 are configured to receive a digital data signal from the electronic access apparatus 510. The RF components 540 are also configured to transmit digital data signals to the electronic access apparatus 510. The RF components 540 can have an associated signal processing circuit 542 to process a digital data signal. In some embodiments, the RF signal can also supply a portion of the power by powering analog front end device. In some embodiments, the electronic access apparatus 510 is configured to transmit both power and data signals from the optical light source 516 and the RF components 524. In some embodiments, the optical light source only provides the power signal and the RF components only provide the data signal. In such embodiments, the signal processing circuit 544 associated with the photovoltaic cell can be omitted and/or the diode 344 associated with RF components 540 can be omitted. In some embodiments, the diode 344 is not included.

The electronic access apparatus 510 can transfer power to the electronic lock 530 via the optical light source 516. The optical light source 516 is configured to emit optical light onto the photovoltaic cell 538 on the electronic lock 530. The photovoltaic cell 538 is configured to convert the optical light to power. After sufficient power has been transferred from the electronic access apparatus 510 to the electronic lock 530, the microcontroller 332 boots up and can process the digital data signal received at the RF components 540. The microcontroller 332 verifies the key identifiers and sends the command to actuate the lock mechanism 350.

Figure 6:
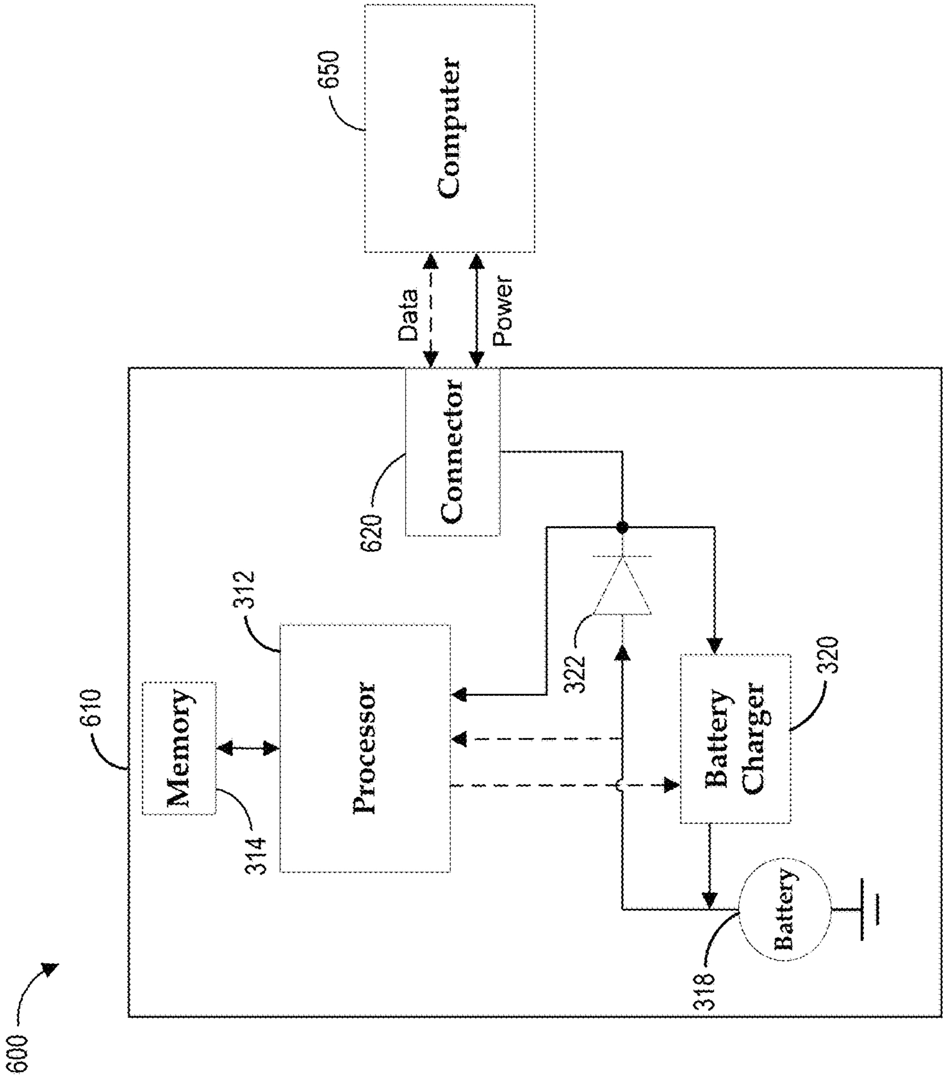
FIG. 6 is a block diagram of an embodiment of a computer connected to an electronic access apparatus.

FIG. 6 shows a detailed block diagram of an embodiment of a computer 650 connected to an electronic access apparatus that includes a rechargeable battery 330 via a connector 620. The computer 650 can be, for example, a device containing a host USB interface, a desktop computer, flash drive, a notebook computer, a handheld computer, a mobile phone, or another type of computing device. The computing device 650 can communicate wirelessly with the electronic lock.

In one embodiment, the electronic access apparatus 610 is connected to the computer via a USB connector 620. When Pin 1 of the USB connector is connected to a powered USB pin (for example, on a computer 650 or on a USB charging device, not shown), the electric potential on Pin 1 is higher than the electric potential at the battery 318 terminal, the output of the comparator changes, and the diode 322 is open or "off." In this state, the electric potential on Pin 1 is substantially equal to the electric potential supplied by a powered USB bus when the USB connector is plugged into a computer. The output change of comparator will trigger the computer mode interrupt or reset of the processor 312. The processor 312 will enter a computer connection mode. In PC mode that computer can update the keys LCF files to reconfigure the lock and also allow the key to be used a USB memory storage thumb or flash drive. In some embodiments, the USB connector can have four pathways or pins: a power supply pin (Pin 1), a data with clock recovery pin (Pin 2), a data and clock pin (Pin 3), and a ground pin (Pin 4). The D− pin (Pin 2) and D+ pin (Pin 3) are used to transmit differential data signals with encoding that the USB transceivers use to recover a clock. The computer can supply USB data with clock recovery encoding via pins of the computer's USB interface. The USB transceiver can assist in communications between the key and the computer 350. In some embodiments, the processor 312 provides instructions to the battery charger 328 for charging the battery 330 while in the computer connection mode. For example, the battery charger 328 can be a Linear Tech LTC4065L from Linear Technology of Milpitas, CA, a battery charger for a lithium ion battery, or another suitable battery charger.

Figure 7B:
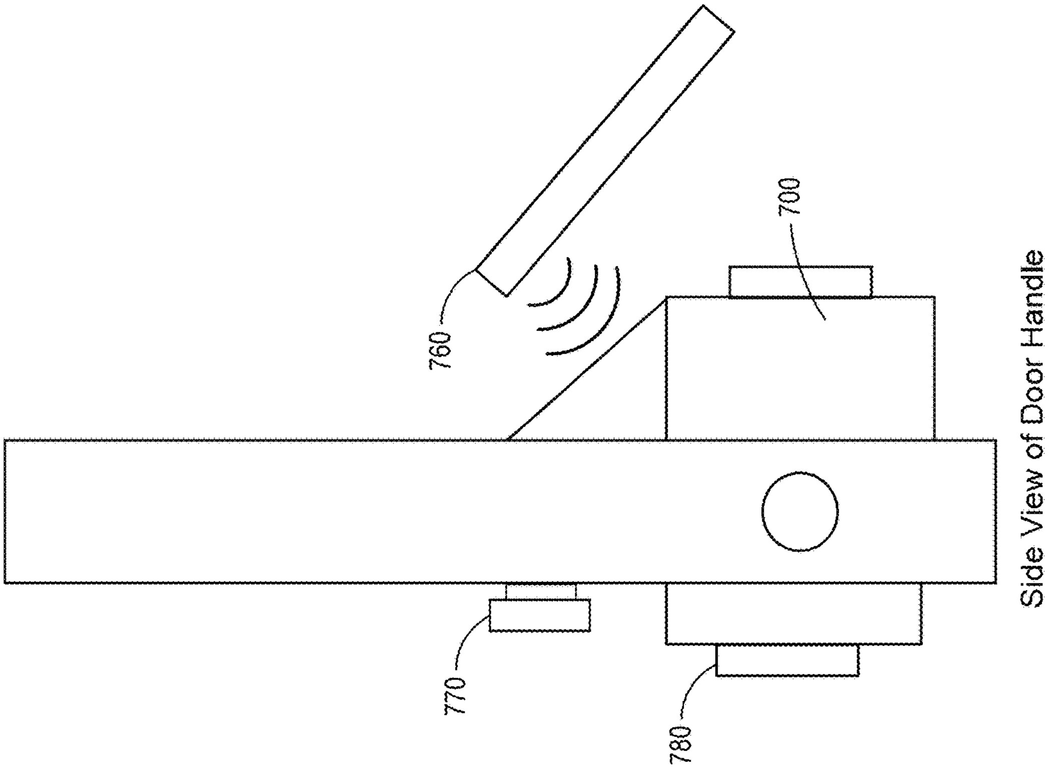
FIGS. 7A-7B illustrate an embodiment of an electronic lock and door handle.
Figure 7A:
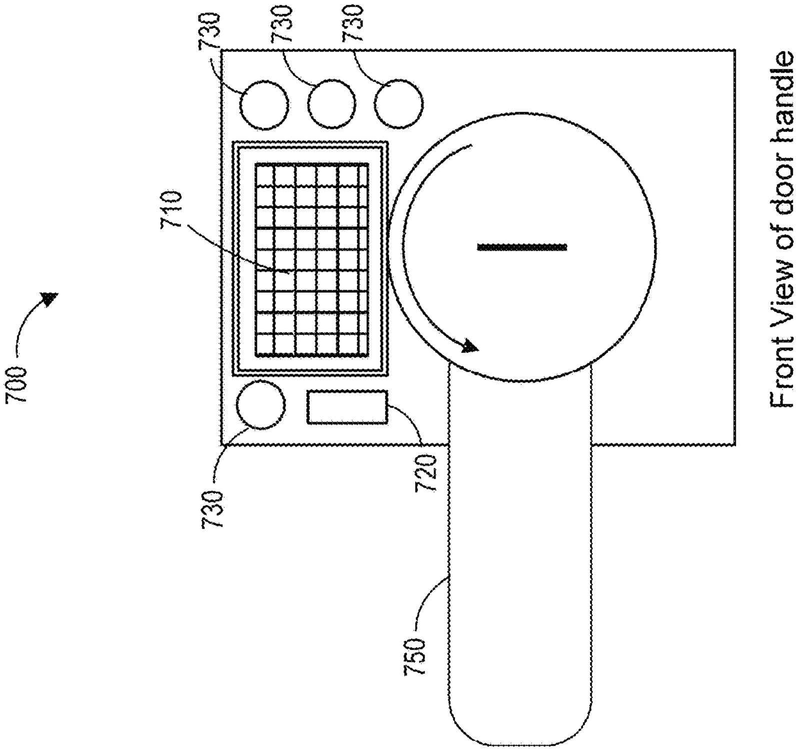

FIGS. 7A and 7B illustrate and embodiment of an electronic lock 700. FIG. 7A illustrates a front view and FIG. 7B illustrates a side view of the electronic lock 700. The electronic lock 700 includes an electromagnetic radiation detector 710, such as a photovoltaic cell or antennae or both, an electrical interface port 720, a plurality of light-emitting diodes (LED) 730, and a handle mechanism 750. The electromagnetic radiation detector 710 can be configured to convert optical light or RF signals to energy as described in association with FIGS. 3, 4, and 5. The electrical interface port 720 can be a USB port or other type of mechanical port that establishes communication with the microcontroller of the electronic lock 700. The port 720 can be used as a secondary source of the power and/or data communication for the electronic lock 700 if an electronic access apparatus is not available to provide power to the electronic lock 700 via the electromagnetic radiation detector 710.

In some embodiments, the LEDs 730 can be configured to have different colors to indicate a status of the lock 700. The LEDs 730 can illuminate after the electronic lock 700 has received power. For example, each LED 730, or a combination of LEDs could represent a different state of the lock, such as locked, unlocked, lock programmed, processing, key identifier accepted, or other status. The microcontroller of the lock can control which LED illuminates.

FIG. 7B helps illustrates an embodiment of the shape of the housing of the electronic lock 700. The electronic lock 700 can be shaped such that the electromagnetic radiation detector 710 can be more easily disposed to receiving optical light from solar radiation when using a photovoltaic cell and the lock 700 is outside. The angle of the photovoltaic cell can also help to facilitate communication between the electronic lock 700 and an electronic access apparatus 760. In some embodiments, the electronic lock 700 can be configured so that it is substantially planar with the door.

Figure 14:
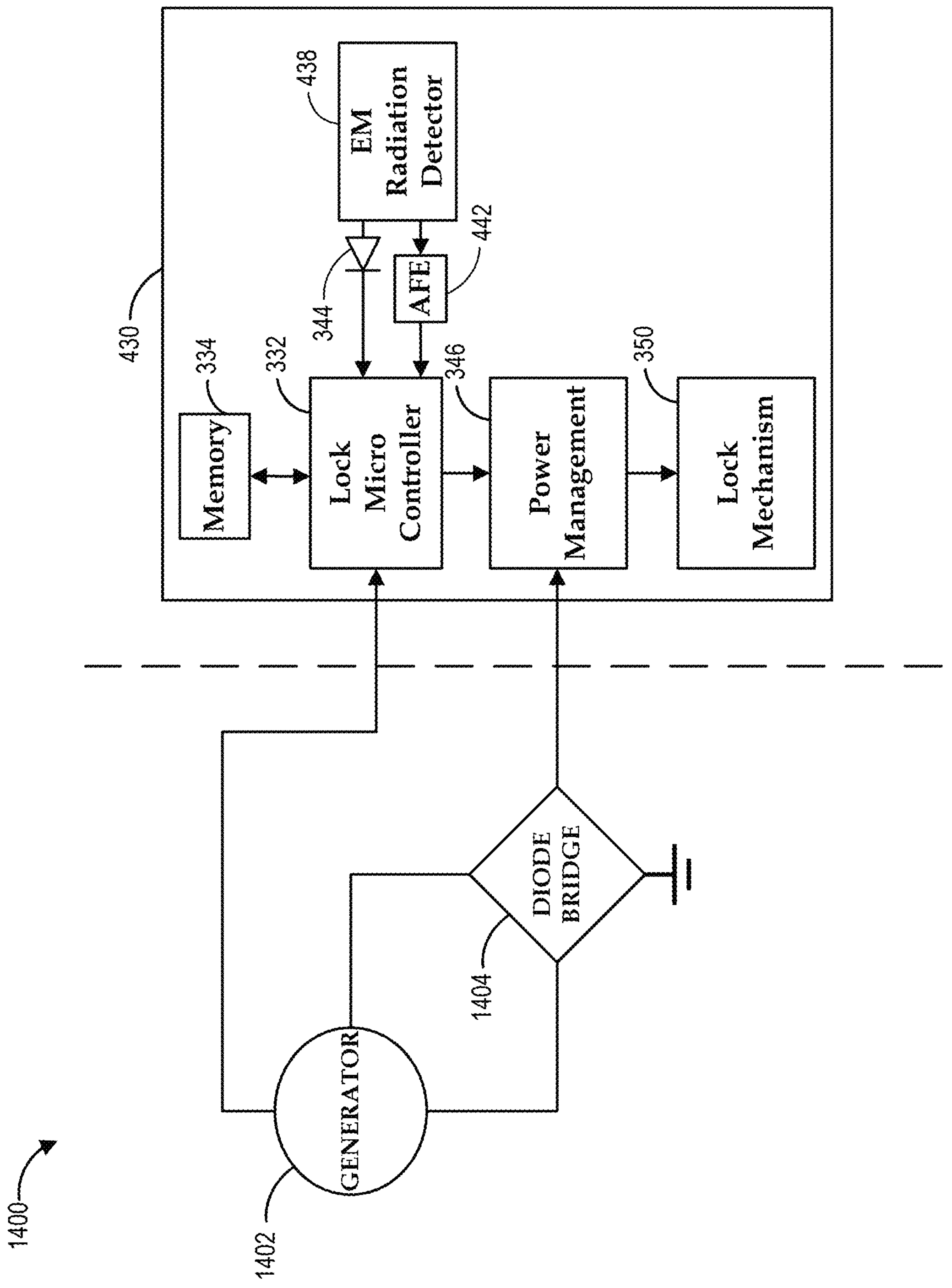
FIG. 14 illustrates an embodiment of an electronic lock that that includes a lock handle configured to actuate a lock mechanism using mechanical energy.

FIG. 7B also illustrates an embodiment of a lock handle 770. The lock handle 770 can provide a mechanical interface for controlling the state of the lock mechanism (e.g., locked or unlocked). The lock handle 770 can be used to generate electrical energy based on the physical manipulation of the lock handle 770. When the lock handle 770 is rotated, or otherwise manipulated, in a first direction, the lock can be set in a first state, such as an unlocked state. When the lock handle 770 is rotated, or otherwise manipulated, in a second direction, the lock can be set in a second state, such as a locked state. The lock handle 770 can be used to set the state independent of an electronic key and can be configured so no authentication is required to lock or unlock the lock mechanism. In some embodiments, the door handle 780 can provide the same functionality as the lock handle 770 without requiring an additional mechanical interface. In one embodiment, the lock handle 770 can interface with the electronic lock 430 as illustrated in FIG. 14. The electronic lock can have the same energy and power requirements as discussed herein.

Figure 8:
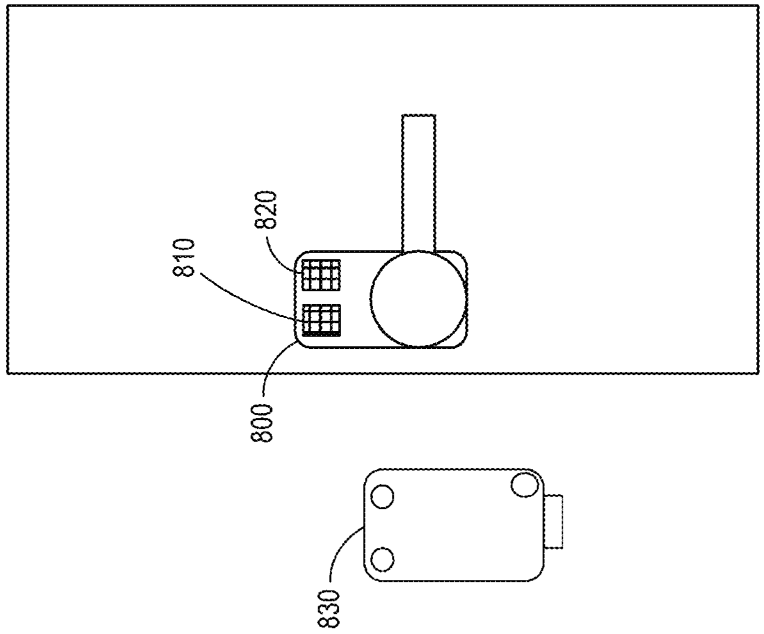
FIG. 8 illustrates another embodiment of an electronic lock and door handle.

FIG. 8 illustrates another embodiment of an electronic lock 800 and an electronic access apparatus 830. In this embodiment, the electronic lock 800 has a first electromagnetic radiation detector 810, such as a photovoltaic cell or antennae and a second electromagnetic radiation detector 820, such as a photovoltaic cell or second antennae. The first electromagnetic radiation detector 810 is configured to unlock the electronic lock and the second electromagnetic radiation detector 820 is configured to lock the electronic lock. In some embodiments, the microcontroller can measure the voltage differences between two or more coils to determine direction and/or movement associated the electronic apparatus. The direction and/or movement information can be used to determine the lock instruction, such as a lock or unlock instruction. The electronic access apparatus 830 can be a button-less controller that can lock or unlock the lock 800 based on which electromagnetic radiation detector receives power from the electronic access apparatus 830. In some embodiments, an electronic button-less key can be used with only a single electromagnetic radiation detector by toggling from lock to unlock. In one embodiment, this can be done by writing the state of the lock in nonvolatile memory of microcontroller once a match is determined and before the microcontroller decides to actuate the lock mechanism. In these instances, the photovoltaic cell can cause the lock mechanism to toggle the current state of the lock (e.g., lock to unlock and visa-versa). In some embodiments, the electronic apparatus can determine a direction and/or movement of the electronic apparatus in order to determine the lock or unlock instruction to be sent to the electronic lock. For example, the electronic apparatus can include an accelerometer. The electronic key apparatus be configured such that it does not include any buttons.

Figure 9:
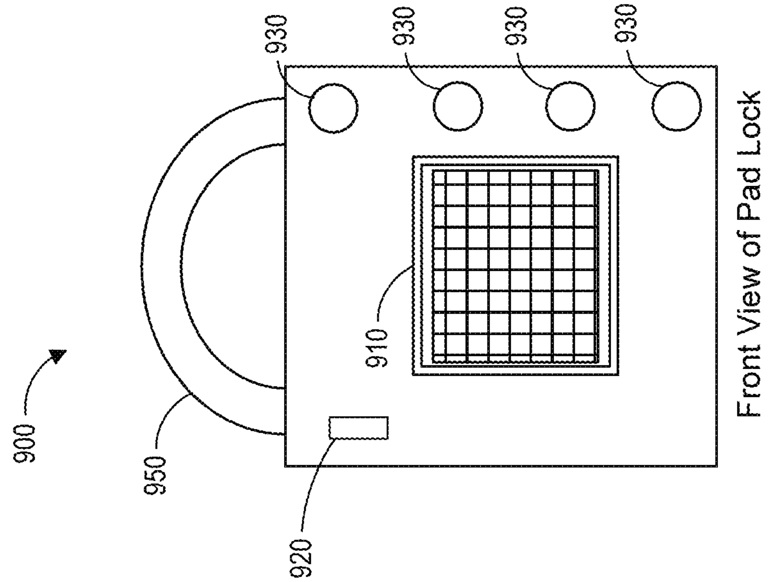
FIG. 9 illustrates an embodiment of an electronic pad lock.

FIG. 9 illustrates a mobile electronic pad lock 900. The electronic pad lock 900 includes an electromagnetic radiation detector 910, such as a photovoltaic cell or antennae, an electrical interface port 920, a plurality of light-emitting diodes 930, and a lock mechanism 950. The electronic pad lock functions in substantially the same manner as the other electronic locks described herein. In some embodiments, the electronic pad lock 900 can also include a geographic location component that is configured to only allow access to the lock when the lock is within a specific geographic area. The electronic access apparatus, such as a smart phone, can provide the global positioning system (GPS) location in order to determine the location of the pad lock 900. The pad lock 900 can be configured to unlock or lock, only if the lock is within a specific geographic area (e.g., specific geographic coordinates). This can be the case even if the key identifiers match. In some embodiments, the pad lock 900 can have more than one geographic position associated with it (e.g., home and work).

Figure 10:
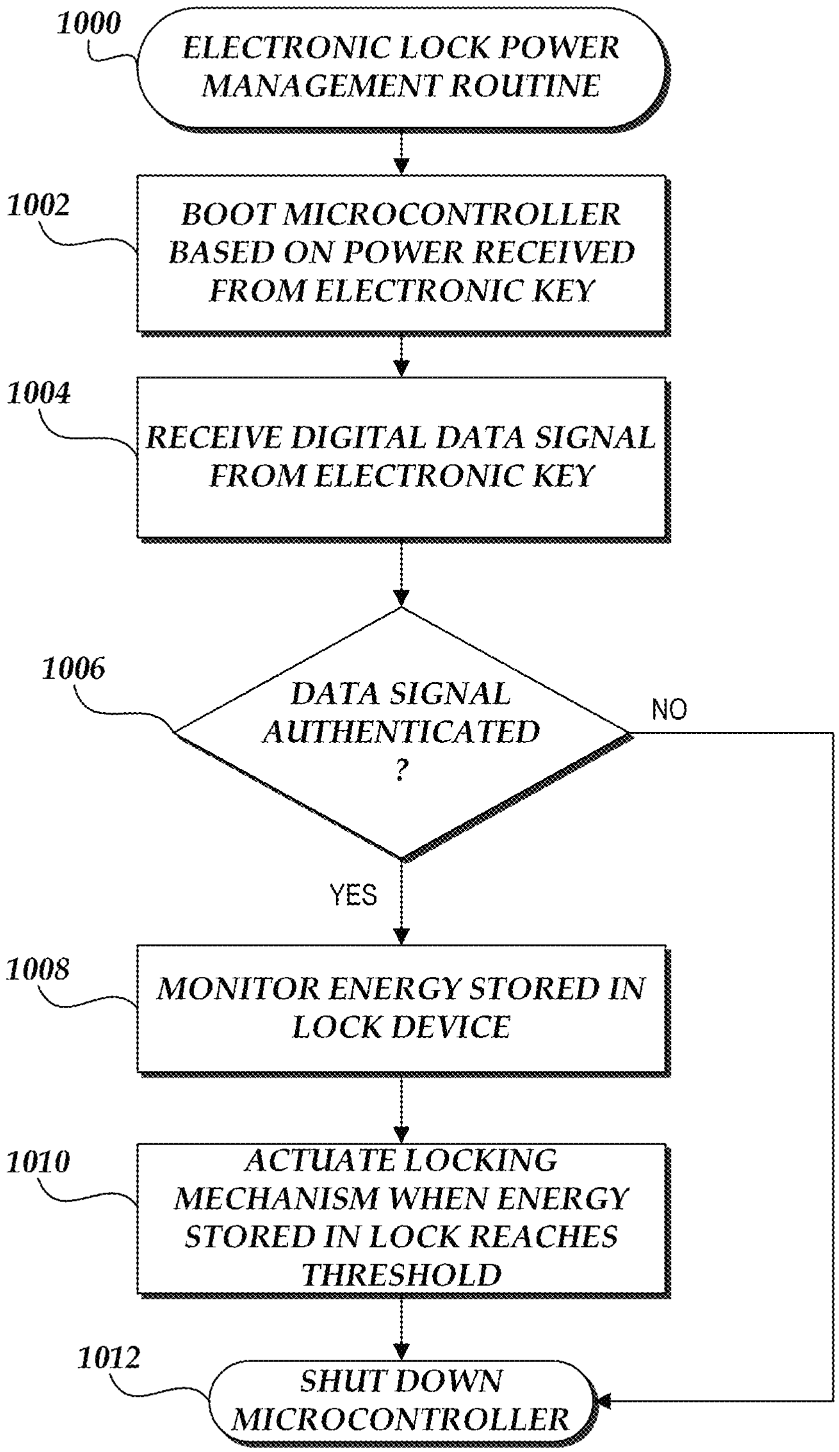
FIG. 10 is a flowchart of an embodiment of an electronic lock power management routine.

FIG. 10 is an embodiment of an electronic lock power management routine 100. The electronic lock power management 1000 routine can be implemented by the microcontroller within an electronic lock. At block 1002, the microcontroller can boot up after the electronic lock has received power from the electronic access apparatus. The microcontroller can have a power threshold such that it boots automatically once enough power has been transferred from the electronic access apparatus to the electronic lock.

At block 1004, the microcontroller can process the digital data signal received from the electronic access apparatus. In some embodiments, the digital data signal can include key identifiers. The key identifiers can include at least one or more public key and/or at least one or more private keys. At block 1006, the microcontroller authenticates that the digital data includes the correct authentication data. In one embodiment, the microcontroller determines whether the key identifiers match the data stored in the key access information file stored in the memory on the electronic lock. If the authentication data provided in the digital data signal is incorrect, the microcontroller shuts down at block 1012. If the authentication data provided in the digital data signal is correct, then the routine proceeds to block 1008.

At block 1008, the microcontroller monitors the power received from the electronic access apparatus. The electronic access apparatus can transmit power simultaneously with the digital data signal. The power can continue to be stored within the electronic lock during authentication at blocks 1004 and 1006. At block 1010, the microcontroller sends the signal to actuate the lock mechanism when the electrical energy level reaches a lock activation threshold. In some embodiment, after the signal has been sent by the microcontroller, a power management module can boost the voltage of the power signal in order to actuate the lock mechanism. In some embodiments, the process of transferring power and authentication of the key can take less than about five seconds, less than about four seconds, less than about three seconds, less than about two seconds, less than about one second, or a time range between any of these times. The amount of time can be dependent upon the strength of the power signal and/or efficiency of the electromagnetic radiation receiver. A stronger power signal can decrease the amount of time and a weaker power signal can increase the amount of time. At block 1012, the microcontroller shuts down.

Figure 11:
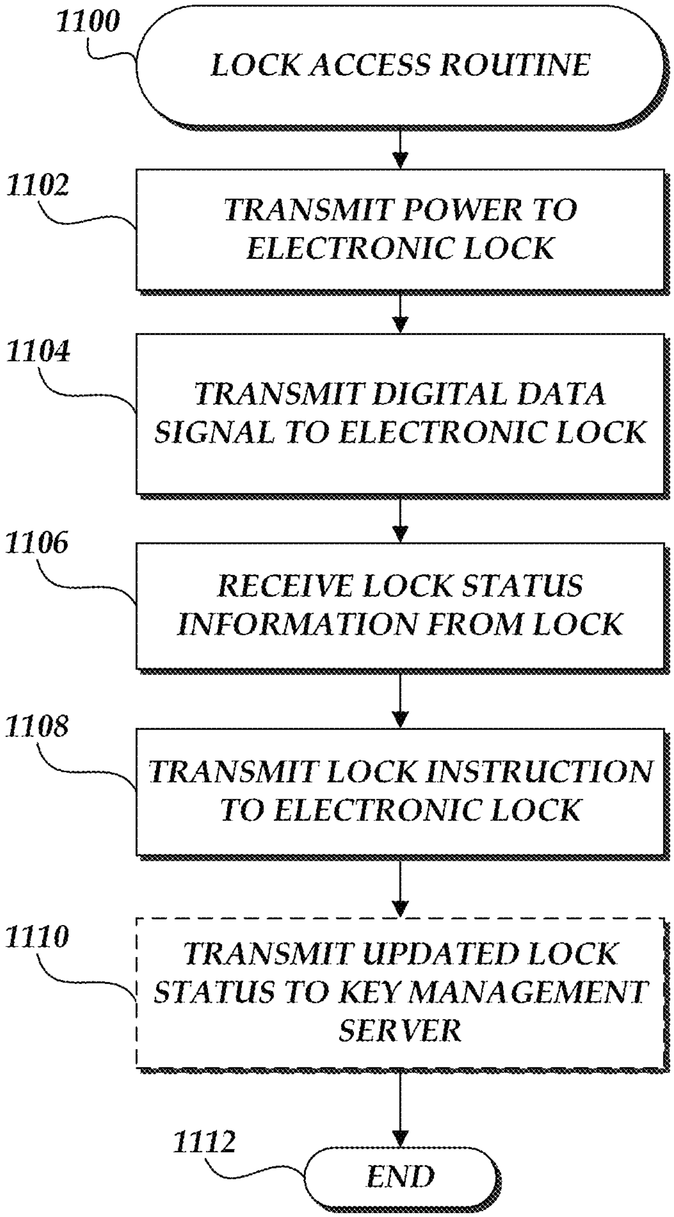
FIG. 11 is a flowchart of an embodiment of a lock access routine for an electronic access apparatus.

FIG. 11 illustrates an illustrative embodiment of a lock access routine 1100. The lock access routine can be implemented by an electronic access apparatus. At block 1102, the electronic access apparatus transmits a power signal to an electronic lock. The microcontroller boots up after receipt of the power signal and can communicate with the electronic access apparatus.

At block 1104, the electronic access apparatus transmits a digital data signal to the electronic lock. In some embodiments, the digital data signal can include key identifiers that are stored on the electronic access apparatus and used to access the lock. The key identifiers can include at least one or more private identifiers and/or one or more public identifiers. If the electronic access apparatus provides the correct authentication data (e.g., key identifiers), the electronic lock can provide lock instructions in order to actuate the electronic lock.

At block 1106, the electronic access apparatus receives information from the electronic lock providing the current status of the lock (e.g., locked or unlocked). The electronic access apparatus can provide the lock status to the user by way of a user interface display, an LED, or other indication. In some embodiments, the lock status will display on the electronic access apparatus, or smart phone and/or on the electronic lock. At block 1108 a lock instruction is transmitted from the electronic access apparatus to the electronic lock. The lock is actuated based on the lock instruction.

At block 1110, optionally before or after the lock has actuated the electronic access apparatus can transmit an updated lock status to an access control system, such as the access control system illustrated in FIG. 2.

In some embodiments, the electronic access apparatus that is accessing the lock could send a message to the master key and/or access control system via a text message or using an application providing a notification that the lock has been accessed. In some embodiments, the access control system can maintain the status of all the locks within each domain.

Figure 12:
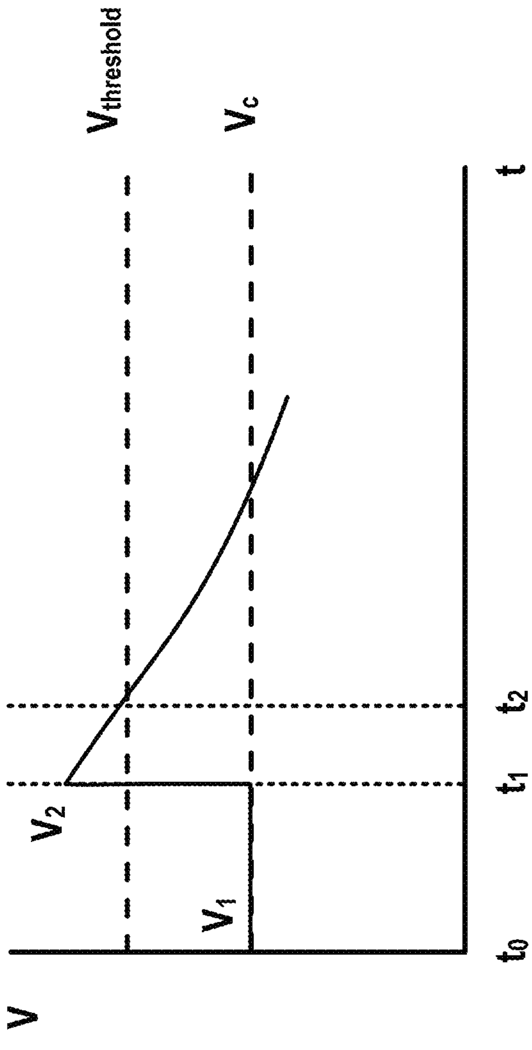
FIG. 12 illustrates an embodiment of plot illustrating voltage over time during an actuation of a lock mechanism.

FIG. 12 illustrates an embodiment of plot illustrating voltage over time during an actuation of a lock mechanism. The plot is not drawn to scale and has been enlarged for illustrative purposes. Voltages on the y-axis and time is on the x-axis. The dashed line $V_c$ represents a voltage output from the at least one capacitor and $V_t$ is the voltage actuation threshold of the lock mechanism. The first voltage value, $V_1$, represents the voltage stored between $t_0$ and $t_1$. The second voltage value, $V_2$, represents an increased voltage value of the voltage output from the capacitor.

The time periods for the various modes of operation of the lock mechanism are illustrated. The time periods are not to scale and have been enlarged for illustrative purposes. A first period of time, between $t_0$ and $t_1$, represents a charging mode, or first mode of operation, of the electronic lock. A second period of time, between $t_1$ and $t_2$, represents an actuation mode, or second mode of operation.

During the charging mode of operation, at least one capacitor stores energy received from the wireless power signal. The energy that is stored by the capacitor(s) can be output at a first voltage represented by $V_1$. The first period of time can be based on satisfying a charge mode threshold. In some embodiments, the charge mode threshold can be a time-based threshold or a charge-based threshold. A time based threshold can be a determined period of time after the powering the microcontroller, such as 1 second, 2 seconds, 3 seconds, 5 seconds or other determined period of time. The charge-based threshold can be based on a charge of one or more capacitors. The charge state of the capacitor(s) can be monitored to determine when the charge state has satisfied the charge threshold. The length of time of the charge mode, between $t_0$ and $t_1$, can be less than 1 second, less than 2 seconds, less than 3 seconds, less than 5 seconds, or other period of time.

When the charge mode threshold is satisfied, the microcontroller 332 can transition from the charge state to the actuation state. In the actuation state the microcontroller 332 can send an actuation instruction to the power management module 346. The actuation instruction can trigger the actuation of the lock mechanism 350. The actuation instruction can trigger the power management module 346 to boost the voltage from $V_1$ to $V_2$. The $V_2$ value is greater than the $V_1$ value and is at or above a voltage threshold for the actuation of the lock mechanism 350. After the voltage has been boosted to $V_2$, the lock mechanism can be actuated using the stored energy from the capacitor(s). In some illustrative embodiments, $V_1$ is between 2 and 3 volts and $V_2$ is between 3.6 and 6.8 volts. In some embodiments, the voltage output of the capacitor(s), $V_c$, is at or above the voltage actuation threshold, $V_t$, of the lock mechanism 350 and does not need to be increased to actuate lock mechanism 350. The output voltage of the capacitor may be at or above actuation threshold of lock mechanism.

During the actuation mode, also referred to as an actuation time period, between $t_1$ and $t_2$, the voltage value is allowed to float or otherwise vary as the lock actuates. As illustrated, during the actuation the voltage value drops below the $V_2$ value and stays above the voltage actuation threshold, $V_t$, throughout the actuation period. In some embodiments, the voltage value is not controlled or regulated after initiation of the lock actuation by the microcontroller 332 and power management module 346. The length of time of the actuation mode, between $t_1$ and $t_2$, can be less than 1 second, less than 100 milliseconds, less than 50 milliseconds, or other period of time for the lock mechanism to actuate. Depending on the type of actuation, such as a lock or unlock actuation, the actuation time can vary. For example, in some embodiments the unlock operation can take more time than the lock operation. In some embodiments, the lock microcontroller can receive power from the electromagnetic radiation receiver during the first mode, the second mode, or both of modes of operation.

Figure 13:
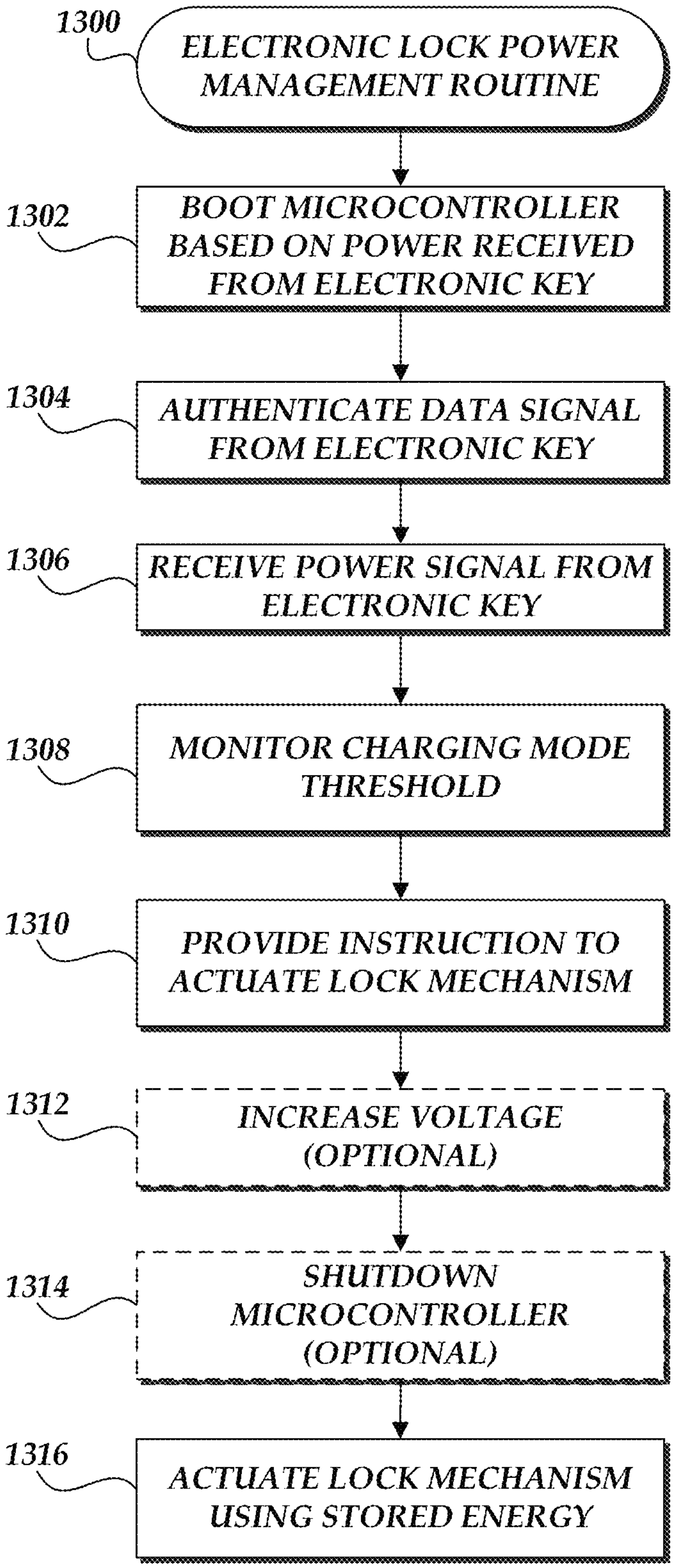
FIG. 13 illustrates an embodiment of an electronic lock power management routine.

FIG. 13 illustrates an embodiment of an electronic lock power management routine 100. The electronic lock power management 1300 routine can be implemented by the microcontroller 332 within an electronic lock. At block 1302, the microcontroller can boot up after the electronic lock has received power from an electronic access apparatus. The microcontroller 332 can have a power threshold such that it boots automatically once enough power has been transferred from the electronic access apparatus to the electronic lock.

At block 1304, the microcontroller authenticates that the digital data includes the correct authentication data. In one embodiment, the microcontroller determines whether the key identifiers match the data stored in the key access information file stored in the memory on the electronic lock.

At block 1306, the electronic lock receives a power signal from the electronic access apparatus. The electronic lock stores energy from the power signal in one or more capacitors. At block 1308, the charging mode threshold is monitored to determine when to transition from charging mode to the actuation mode. The charging mode threshold can be a time-based threshold for a charge-based threshold. When the threshold is satisfied, the microcontroller can transition from charge mode to the actuation mode.

At block 1310, the microcontroller can provide an instruction to actuate the lock mechanism. The construction can be based on instructions received from the electronic access apparatus. In some embodiments, the instruction can be based on information derived by the microcontroller based on the position of lock access apparatus relative to the electronic lock. For example, the lock and include two or more coils that allow the microcontroller to determine the position of electronic access apparatus based on a voltage difference between the coils. In some embodiments, the electronic apparatus can provide the instruction based on movement and/or position of the electronic apparatus.

At block 1312, the power management module can increase the voltage output from the one or more capacitors to a voltage value that is at or above a voltage actuation threshold of the lock mechanism. Depending on the output voltage of the capacitor(s), the output voltage may not need to be increased to satisfy the actuation threshold of the lock mechanism.

At block 1314, the microcontroller can shut down after providing the actuation command instruction. This is an optional step that does not necessarily need to be performed. In some embodiments, the microcontroller can continue to operate until the entire process has been completed as illustrated in FIG. 10.

At block 1316, the lock mechanism is actuated using the energy stored in the one or more capacitors based on the actuation instruction. The voltage is allowed to float or otherwise vary during the actuation of the lock mechanism.

FIG. 14 illustrates an embodiment of an electronic lock that that interfaces with a lock handle or a door handle that is configured to actuate a lock mechanism using mechanical energy, such as the lock handle 770 illustrated in FIG. 7B. The generator can be configured to generate mechanical energy from movement of the handle on the interior side of a door. This can allow lock mechanism to be actuated without using and electronic key. In this embodiment, the electronic lock 1400 includes a generator 1402 and the diode bridge 1404. No authentication is required to lock or unlock the door when using the lock handle on the inside door. The generator can generate the power to power the lock microcontroller 332 and the lock mechanism 350. The microcontroller 332 and determine whether to lock or unlock the door based on the direction of the rotation of the lock handle. The microcontroller 332 can then instruct lock mechanism to actuate according.

It is recognized that the term "module" may include software that is independently executable or standalone. A module can also include program code that is not independently executable. For example, a program code module may form at least a portion of an application program, at least a portion of a linked library, at least a portion of a software component, or at least a portion of a software service. Thus, a module may not be standalone but may depend on external program code or data in the course of typical operation.

Although systems and methods of electronic access control are disclosed with reference to preferred embodiments, other embodiments will be apparent to those of ordinary skill in the art from the disclosure herein. Moreover, the described embodiments have been presented by way of example only, and are not intended to limit the scope of the inventions. Rather, a skilled artisan will recognize from the disclosure herein a wide number of alternatives for the exact ordering the steps, how an electronic access apparatus is implemented, how an electronic lock is implemented, or how an admin application is implemented. Other arrangements, configurations, and combinations of the embodiments disclosed herein will be apparent to a skilled artisan in view of the disclosure herein and are within the spirit and scope of the inventions as defined by the claims and their equivalents.

What is claimed is:

1. A handheld electronic apparatus for use with an electronic lock, the handheld electronic apparatus comprising:
- a battery configured to supply energy to components of the electronic apparatus;
- a physical storage medium storing at least one identifier;
- an electromagnetic radiation source;
- a signal processing circuit connected to the electromagnetic radiation source;
- at least one processor configured with computer executable instructions to cause the electromagnetic radiation source to:
  - transmit a wireless digital data signal to an electromagnetic radiation receiver, the digital data signal comprising the at least one identifier,
  - transmit a wireless power signal to the electronic lock to provide power to the electronic lock sufficient to actuate a lock mechanism within the electronic lock between a locked state and an unlocked state, and
- wherein the wireless power signal delivers electric power to the electronic lock during a lock access time period of less than or equal to six seconds;
- wherein a lock controller is configured to control operation of the lock mechanism based at least in part on the wireless digital data signal received from the electronic apparatus,
- wherein the lock mechanism is capable of actuating between the locked state and the unlocked state using the electric power supplied by the wireless power signal, and
- wherein the handheld electronic apparatus can be less than 10 cm from the electronic lock when transmitting the wireless digital data signal and the wireless power signal to actuate the lock mechanism.

2. The handheld electronic apparatus of claim 1, wherein the electronic lock uses up to 120 milliwatts of electric power from the wireless power signal over the lock access time period of less than or equal to six seconds.

3. The handheld electronic apparatus of claim 1, wherein the electronic lock uses up to 720 millijoules of electric energy from the wireless power signal over the lock access time period of less than or equal to six seconds.

4. The handheld electronic apparatus of claim 3, wherein the wireless digital data signal and the wireless power signal use near field communication protocols to power and communicate with the electronic lock.

5. The handheld electronic apparatus of claim 4, wherein the computer executable instructions further configure the at least one processor to access the electronic lock when the electronic apparatus is within a defined distance of the electronic lock.

6. The handheld electronic apparatus of claim 5, wherein the lock mechanism is configured to toggle between a locked state and an unlocked state based on a lock instruction received from the electronic apparatus.

7. The handheld electronic apparatus of claim 5, wherein the computer executable instructions further configure the at least one processor to transmit authentication data including at least one private identifier not available to a user linked to an alias stored in memory of the electronic apparatus.

8. The handheld electronic apparatus of claim 7, wherein the computer executable instructions further configure the at least one processor to transmit the power after authentication and provide an indication of a lock status of the electronic lock.

9. The handheld electronic apparatus of claim 4, wherein the lock mechanism is capable of actuating between the locked state and the unlocked state using only the electric power supplied by the wireless power signal.

10. An electronic lock comprising:

a lock mechanism electrically connected to a lock controller, the lock mechanism configured to actuate between a locked state and an unlocked state;

an electromagnetic radiation receiver configured to:

receive an electromagnetic wireless digital data signal from an electronic apparatus, and receive an electromagnetic wireless power signal from the electronic apparatus;

the lock controller configured to control operation of the lock mechanism based on the electromagnetic wireless digital data signal from the electronic apparatus;

a power management circuitry configured to actuate the lock mechanism based on input received from the lock controller;

wherein the lock mechanism is capable of actuating between the locked state and the unlocked state using electric power supplied by the wireless power signal;

wherein the wireless power signal delivers the electric power to the electronic lock over a lock access time period of less than or equal to six seconds; and wherein the lock mechanism is configured to actuate using the electric power received from the wireless power signal during transmission of the wireless power signal.

11. The electronic lock of claim 10, wherein the electronic apparatus can be positioned up to ten centimeters from the electronic lock.

12. The electronic lock of claim 11, wherein the electronic lock is configured to use up to 120 milliwatts of electric power received from the wireless power signal over the lock access time period of less than or equal to six seconds.

13. The electronic lock of claim 11, wherein the electronic lock is configured to use up to 720 millijoules of electric energy received from the wireless power signal over the lock access time period of less than or equal to six seconds.

14. The electronic lock of claim 13, wherein the lock mechanism comprises a motor and a latch, wherein the motor is configured to actuate the latch between the locked state and the unlocked state.

15. The electronic lock of claim 14, wherein the lock mechanism is configured to actuate from the locked state to the unlocked state for a defined time period and after the defined time period actuate from the unlocked state to the locked state.

16. The electronic lock of claim 14, wherein the lock mechanism is configured to remain in a locked state or the unlocked state without power being supplied by the electronic apparatus.

17. The electronic lock of claim 14, wherein the lock controller is further configured to authenticate access of the electronic apparatus, prior to actuating the lock mechanism, based on a determination that authentication data provided by the digital data signal matches authentication data stored in memory on the electronic lock.

18. The electronic lock of claim 14, wherein the electronic apparatus is the only source of electric power for the electronic lock.

19. The electronic lock of claim 18, wherein the electronic lock further comprises at least one capacitor electrically connected to receive the electric power from the electromagnetic radiation receiver; and the power management circuitry is configured to provide the electric power to actuate the lock mechanism further based on an electrical energy level of the at least one capacitor.

20. The electronic lock of claim 18, wherein the electronic lock further comprises a mechanical interface configured to be manually manipulated to actuate the electronic lock between the locked state and the unlocked state, wherein the mechanical interface is configured to be positioned on an interior side of a door.

21. The electronic lock of claim 14, wherein the wireless digital data signal and the wireless power signal use near field communication protocols to power the electronic lock and communicate with the electronic apparatus.

22. The electronic lock of claim 19, wherein the power management circuitry is further configured to receive the electric power from the at least one capacitor at one or more first voltages and output the electric power at one or more second voltages.

23. The electronic lock of claim 22, wherein the lock mechanism is configured to actuate between the locked state and the unlocked state within the lock access time period when a varying voltage is equal to or greater than an actuation voltage threshold of the lock mechanism.

24. A method of locking or unlocking an electronic lock using a handheld electronic apparatus, the method comprising:

receiving, by an electromagnetic radiation receiver, electromagnetic radiation from the handheld electronic apparatus, wherein the electromagnetic radiation comprises a power signal configured to provide electric energy to the electronic lock;

receiving, by the electromagnetic radiation receiver, electromagnetic radiation comprising a digital data signal from the electronic apparatus;

supplying, by power management circuitry, the electric energy to a lock mechanism, wherein the power management circuitry receives the electric energy from the power signal over a lock access time period of up to six seconds; and actuating the lock mechanism based on a lock actuation instruction received from the handheld electronic apparatus, wherein the lock mechanism is configured to actuate using the electric energy received only from the power signal during transmission of the power signal.

* * * * *